(12) United States Patent
Gupta et al.

(10) Patent No.: US 8,819,561 B2
(45) Date of Patent: Aug. 26, 2014

(54) TOOL FOR VISUALIZING CONFIGURATION AND STATUS OF A NETWORK APPLIANCE

(75) Inventors: Sanjay Gupta, Bangalore (IN); Raghu Goyal, Bangalore (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 824 days.

(21) Appl. No.: 12/617,101

(22) Filed: Nov. 12, 2009

(65) Prior Publication Data

US 2010/0122175 A1 May 13, 2010

Related U.S. Application Data

(60) Provisional application No. 61/113,882, filed on Nov. 12, 2008.

(51) Int. Cl.
*G06F 3/00* (2006.01)
*H04L 12/24* (2006.01)

(52) U.S. Cl.
CPC ............ *H04L 41/22* (2013.01); *H04L 41/0893* (2013.01)
USPC ............................ 715/733; 715/736; 709/224

(58) Field of Classification Search
USPC .................................... 715/733, 736; 709/224
See application file for complete search history.

(56) References Cited

U.S. PATENT DOCUMENTS

| | | | | |
|---|---|---|---|---|
| 5,483,631 A | * | 1/1996 | Nagai et al. | 715/736 |
| 6,101,328 A | * | 8/2000 | Bakshi et al. | 717/170 |
| 6,505,248 B1 | * | 1/2003 | Casper et al. | 709/224 |
| 6,578,077 B1 | * | 6/2003 | Rakoshitz et al. | 709/224 |
| 7,117,499 B2 | * | 10/2006 | Kawamoto et al. | 718/105 |
| 7,380,244 B1 | * | 5/2008 | Bussiere et al. | 717/172 |
| 7,383,327 B1 | | 6/2008 | Tormasov et al. | |
| 2002/0158899 A1 | * | 10/2002 | Raymond | 345/736 |
| 2007/0094367 A1 | * | 4/2007 | Esfahany et al. | 709/223 |

OTHER PUBLICATIONS

International Business Machines Corporation: "Reusable, erasable virtual servers" Research Disclosure, Mason Publications, Hampshire, GB, vol. 453, No. 94, Jan. 1, 2002.
International Preliminary Report on Patentability on PCT/US2009/064177 dated May 26, 2011.
International Search Report on PCT/US2009/064177 dated Apr. 7, 2010.
Vilas M. et al: "Signalling Management to Reduce Roaming Effects over Streaming Services" Software Engineering and Advanced Applications, 2006. SEAA '06. 3 2ND Euromicro Conference on, IEEE, PI, Aug. 1, 2006, pp. 398-405.
Written Opinion on PCT/US2009/064177 dated May 12, 2011.

* cited by examiner

*Primary Examiner* — Michael Roswell
(74) *Attorney, Agent, or Firm* — Foley & Lardner LLP; Christopher J. McKenna

(57) ABSTRACT

The present invention is directed towards systems and methods of providing management of network services provided by an intermediary device managing traffic between a plurality of clients and servers. The intermediary device may include one or more virtual servers managing a plurality of services. A user can invoke a visualizer tool of the intermediary device to identify a configuration and an operational status of the virtual servers and services managed by the virtual servers. The visualizer tool may also determine from the configuration two or more services having a common set of configuration properties and managed by a first virtual server. The visualizer tool may establish a service container comprising these services. The visualizer tool may display via an interface a graphical representation of the configuration and the operational status of the first virtual server and the service container identifying the common set of configuration properties of these services.

20 Claims, 19 Drawing Sheets visualizer 400

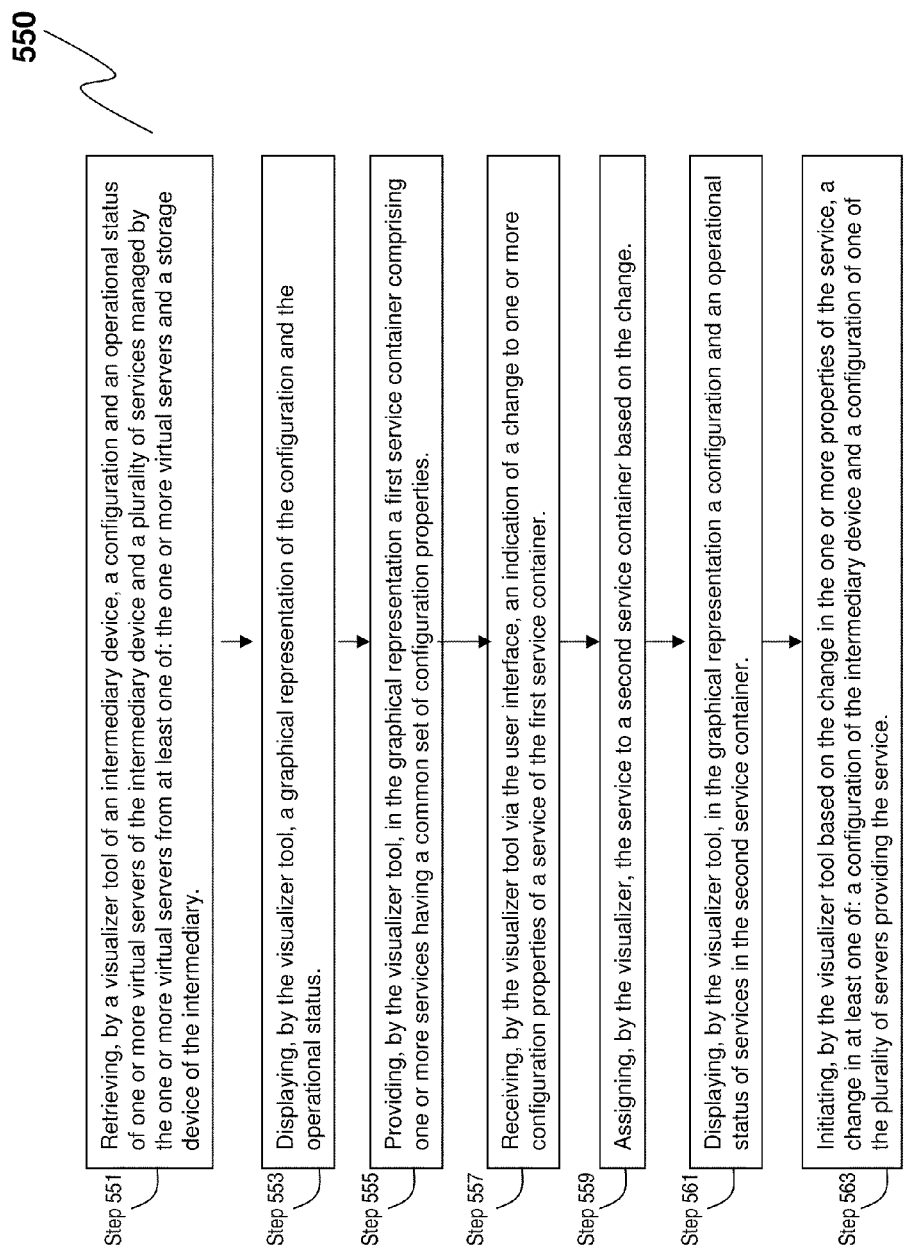

TOOL FOR VISUALIZING CONFIGURATION AND STATUS OF A NETWORK APPLIANCE

RELATED APPLICATION

This application is related to and claims priority to U.S. Provisional Application No. 61/113,882, filed Nov. 12, 2008, entitled "TOOLS FOR VISUALIZING CONFIGURATION AND STATUS OF A NETWORK APPLIANCE", which is incorporated herein by reference in its entirety.

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

FIELD OF THE DISCLOSURE

The present application generally relates to visualization of data communication networks. In particular, the present application relates to systems and methods for providing a visualization tool for the status and configuration of an appliance.

BACKGROUND

An intermediary between a plurality of clients and a plurality of servers may act as an application and/or service delivery controller between the plurality of clients and servers. The controller may have one or more features for controlling or managing network traffic between the clients and servers. These features may be configured by an administrator. As the supported features of the controller grow, more configuration may be involved. As the controller is deployed in more, larger and different environments, the use of the controller becomes more complex as well as its configuration. An administrator of the controller may be challenged in configuring or maintaining a configuration of the controller in any one or more environments.

BRIEF SUMMARY

The present disclosure describes a visualization tool and framework for a unified management user interface to any and/or all of the functions, logic or operations supported or provided by an service and/or application delivery controller (hereafter sometimes generally referred to as "ADC"), such as content switching, traffic management, acceleration, load balancing, security and application firewall (including support for Federal Information Processing Standard), content rewriting (e.g., HTML injection), cache redirection, policies, health monitoring, secure sockets layer virtual private network (SSL VPN) and domain name system (DNS). This ADC may be deployed with any number of servers, applications, networks, services and users and group of users. With the scalability and extensibility of the ADC to support a wide variety and complexity of environments, the corresponding configuration, management (including organization and presentation of information), and use of the ADC also becomes wide ranging and complex. The visualizer tool comprises an interface and tool for assisting an administrator to determine the functionality of the ADC that is configured and to assist in applying functionality that may have not yet been configured.

In one aspect, the present disclosure is related to a method of providing management of network services provided by an intermediary device. The method includes invoking a visualizer tool for an intermediary device that manages network traffic between a plurality of clients and a plurality of servers. The intermediary device includes one or more virtual servers managing a plurality of services. The visualizer tool may identify a configuration and an operational status of the one or more virtual servers and one or more services managed by the one or more virtual servers. The visualizer tool may determine from the configuration two or more services having a common set of configuration properties and managed by a first virtual server. The visualizer tool may establish a service container comprising the two or more services. The visualizer tool may display via a user interface a graphical representation of the configuration and the operational status of the first virtual server. The visualizer tool may also display the service container identifying the common set of configuration properties of the two or more services.

In some embodiments, the visualizer tool retrieves the configuration and the operational status from at least one of: the one or more virtual servers and a storage device of the intermediary. The identified configuration may providing at least one of: content switching, traffic management, load balancing, content insertion, cache redirection, data acceleration, security and application firewall, and health monitoring. The identified configuration may indicate that a second virtual server is bound to a first virtual server. The identified configuration can indicate that a first policy is bound to a first virtual server.

In some embodiments, the common set of configuration properties includes at least one of: a monitoring function, a policy, a policy label and a service group of the service. The service container may represent the set of configuration common to the two or more services. In one embodiment, the visualizer tool may indicate an error if two or more service containers comprise a common service. One of the plurality of servers may provide at least one of the services managed by the one or more virtual servers.

In another aspect, the present disclosure describes a method of providing management of network services provided by an intermediary device, including displaying, by a visualizer tool of the intermediary device via a user interface, a graphical representation of a configuration and an operational status of one or more virtual servers of the intermediary device and a plurality of services managed by the one or more virtual servers. The intermediary device manages network traffic between a plurality of a clients and a plurality of servers. The visualizer tool may provide in the graphical representation a first service container comprising one or more more services having a common set of configuration properties. The visualizer tool may receive via the user interface an indication of a change to one or more configuration properties of a service of the first service container. The visualizer tool may assign the service to a second service container based on the change. The visualizer tool may displaying in the graphical representation a configuration and an operational status of services in the second service container.

In some embodiments, the visualizer tool retrieves the configuration and the operational status from at least one of: the one or more virtual servers and a storage device of the intermediary. The configuration may provide at least one of: content switching, traffic management, load balancing, content insertion, cache redirection, data acceleration, security and application firewall, and health monitoring. In one embodiment, the indication of a change to the one or more configuration properties of the service can include at least one of: a change in a monitoring function and a change in the service group of the service. The second service container may represent a second set of configuration properties in common with the service after the change.

The visualizer tool may establish the second service container as a new service container if no other service containers represent the second set of configuration properties in common with the service. In some embodiments, the visualizer tool may display at least one of: the service type of one or more services of the second service container, the utilization of the one or more services, and the number of services in the second service container. The visualizer tool may initiate based on the change in the one or more properties of the service, a change in at least one of: a configuration of the intermediary device and a configuration of one of the plurality of servers providing the service. In some embodiments, one or more services of the service container are managed by a first virtual server. Further, one of the plurality of servers may provide the service.

In still another aspect, the present disclosure is directed to a method of providing management of network services provided by an intermediary device. The method includes invoking a visualizer tool for an intermediary device that manages network traffic between a plurality of clients and a plurality of servers. The intermediary device includes one or more virtual servers managing a plurality of services. The visualizer tool may identify a configuration and an operational status of the one or more applications and one or more services managed by the one or more applications. The visualizer tool may determine from the configuration two or more services having a common set of configuration properties and managed by a first application. The visualizer tool may establish a service container comprising the two or more services. The visualizer tool may display via a user interface a graphical representation of the configuration and the operational status of the first application. The visualizer tool may also display the service container identifying the common set of configuration properties of the two or more services.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 5B is a flow diagram of another embodiment of steps of a method for providing management of network services provided by an intermediary device.

Figure 1A:
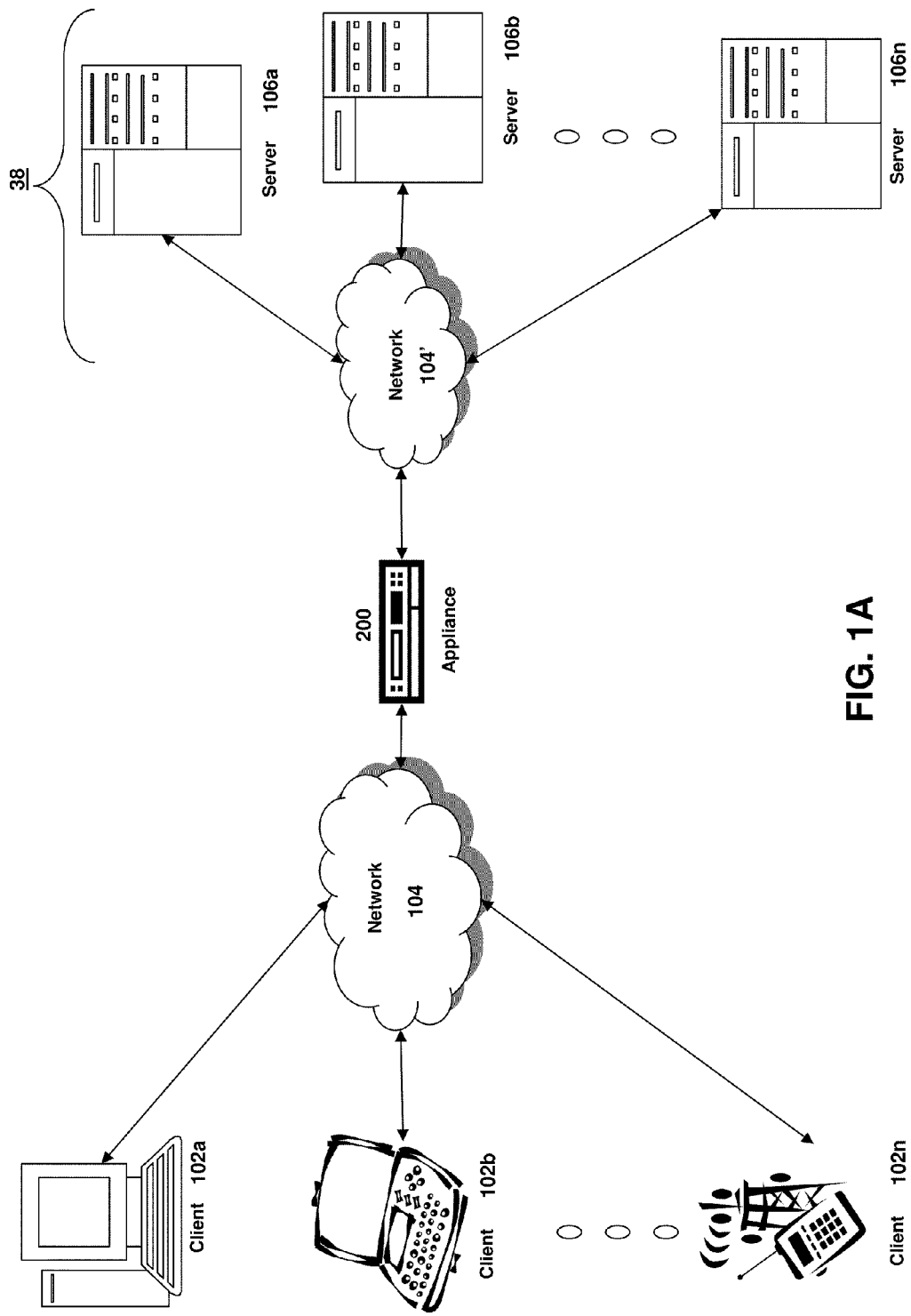
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server; and Section D describes systems and method of a visualization tool for visualizing, managing and changing configuration and status information of an appliance.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
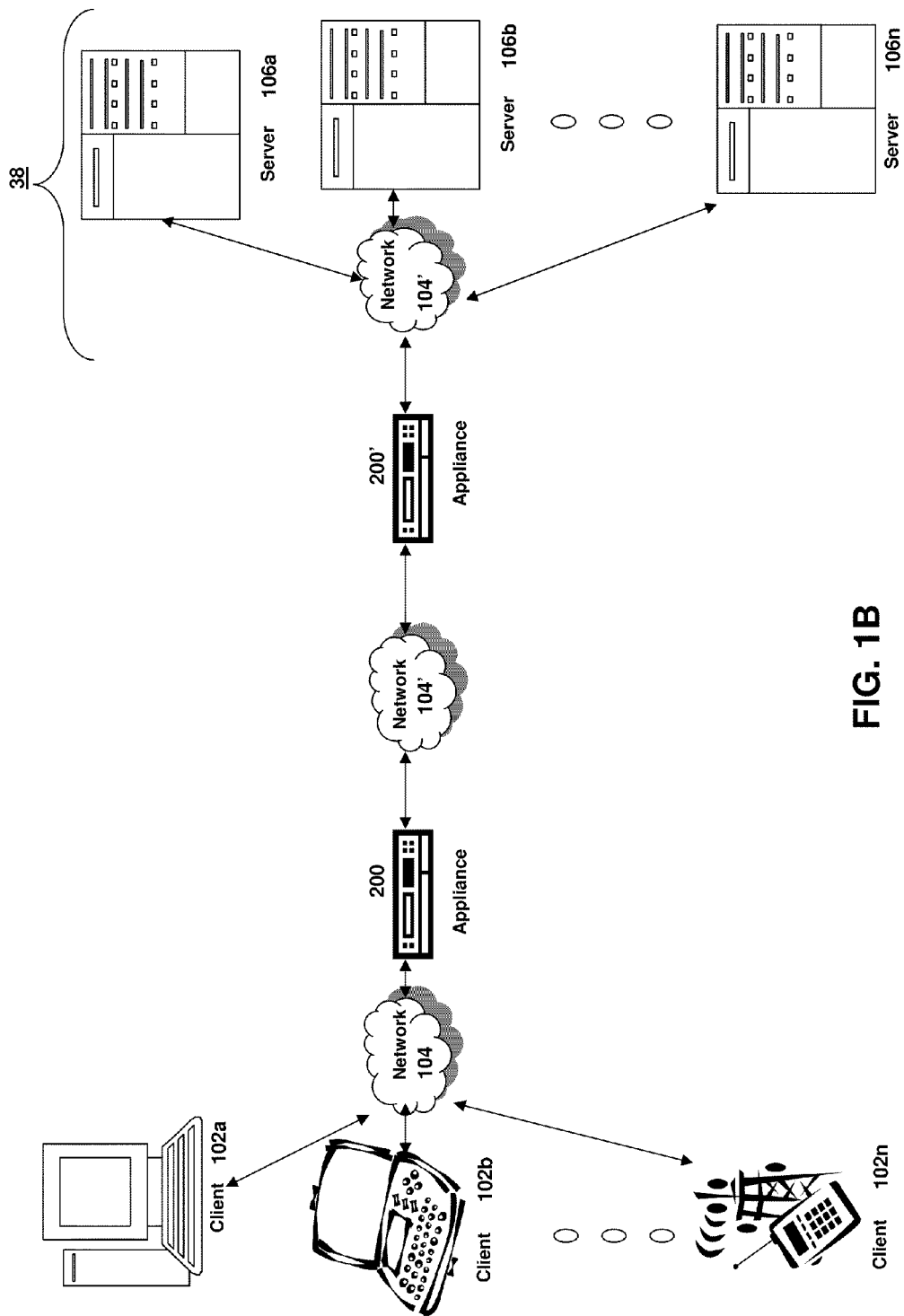
FIG. 1B is a block diagram of an embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server.

Figure 1C:
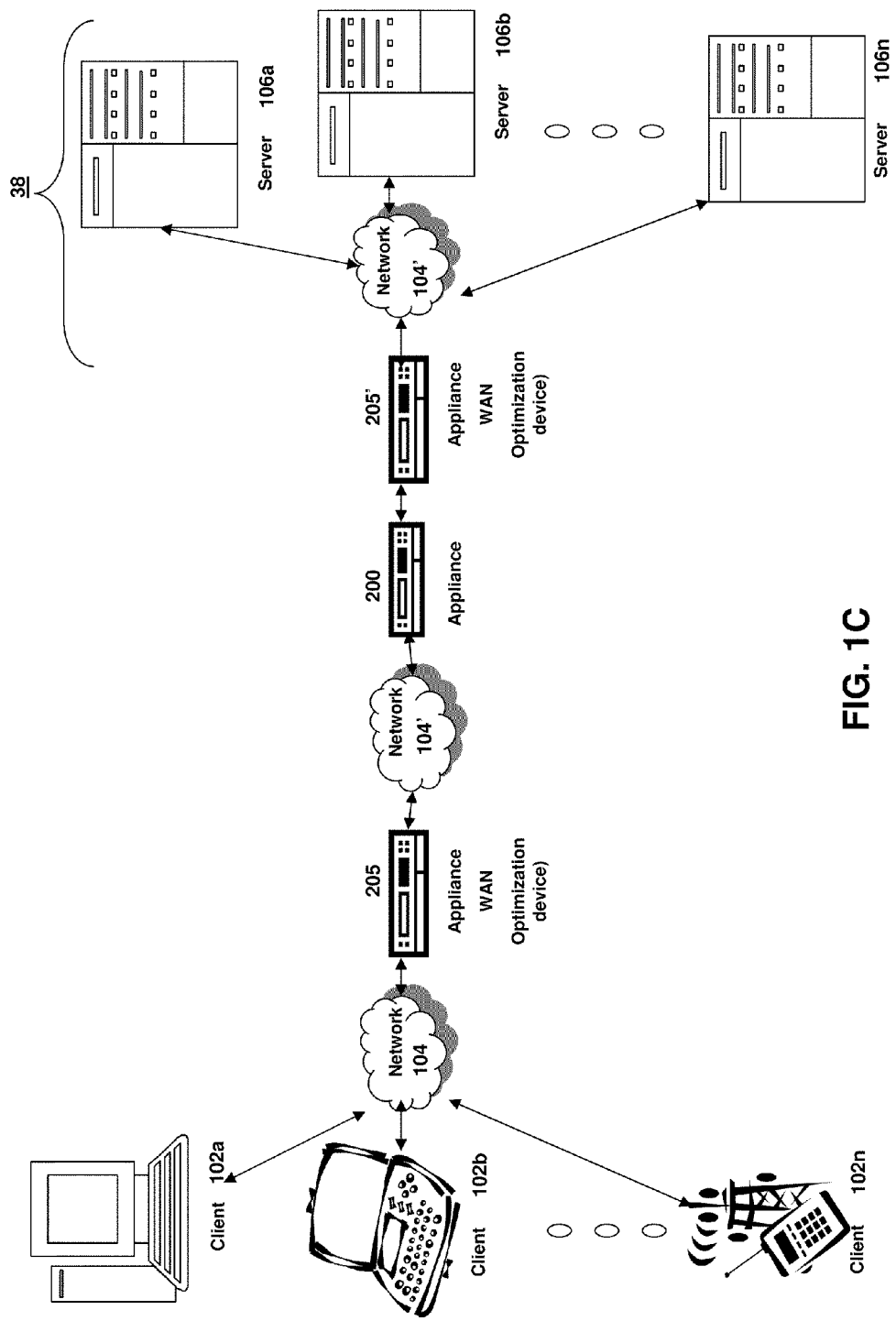
FIG. 1C is a block diagram of another embodiment of an environment for delivering a computing environment from a server to a client via a plurality of appliances.

Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
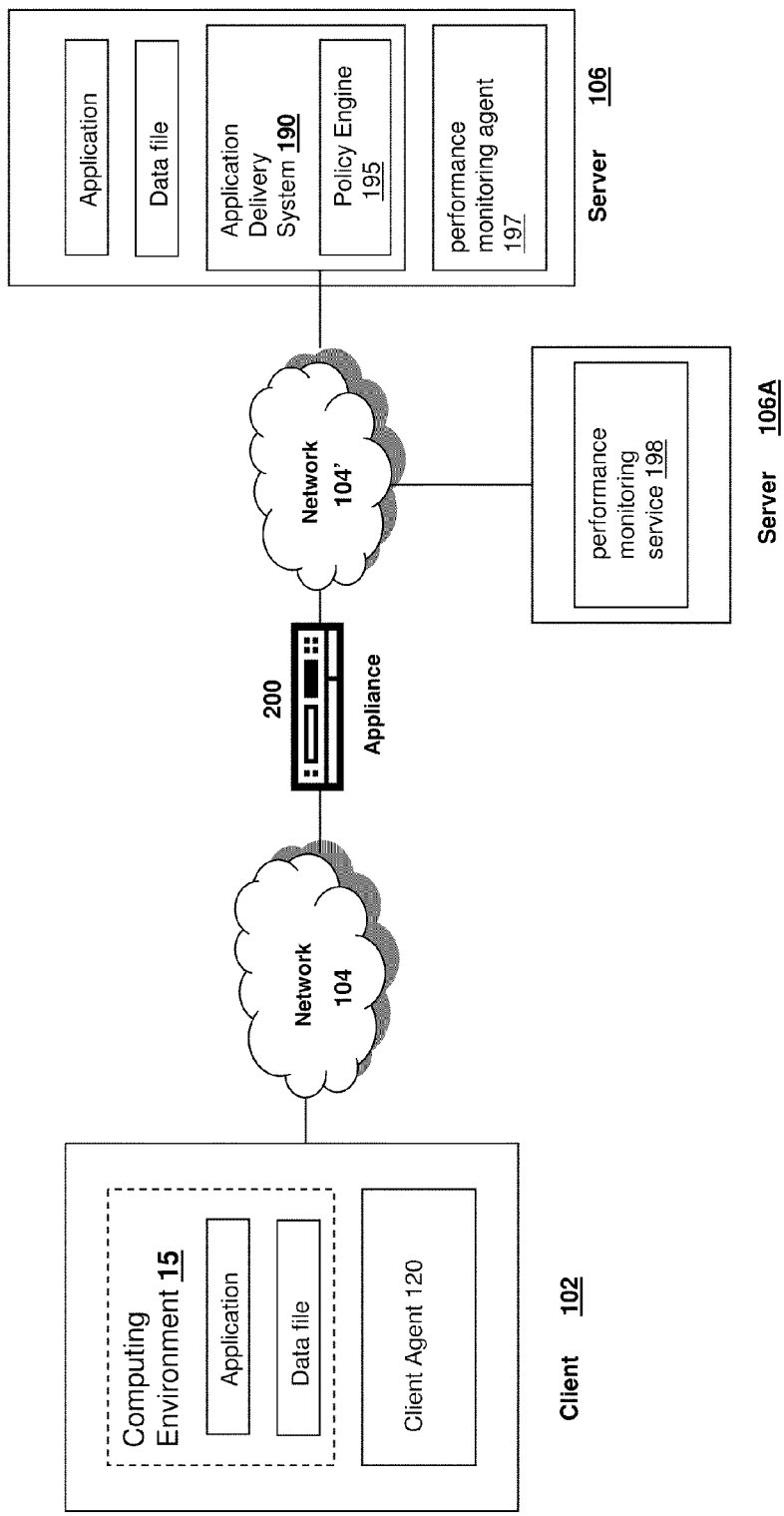
FIG. 1D is a block diagram of another embodiment of an environment for delivering a computing environment from a server to a client via.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
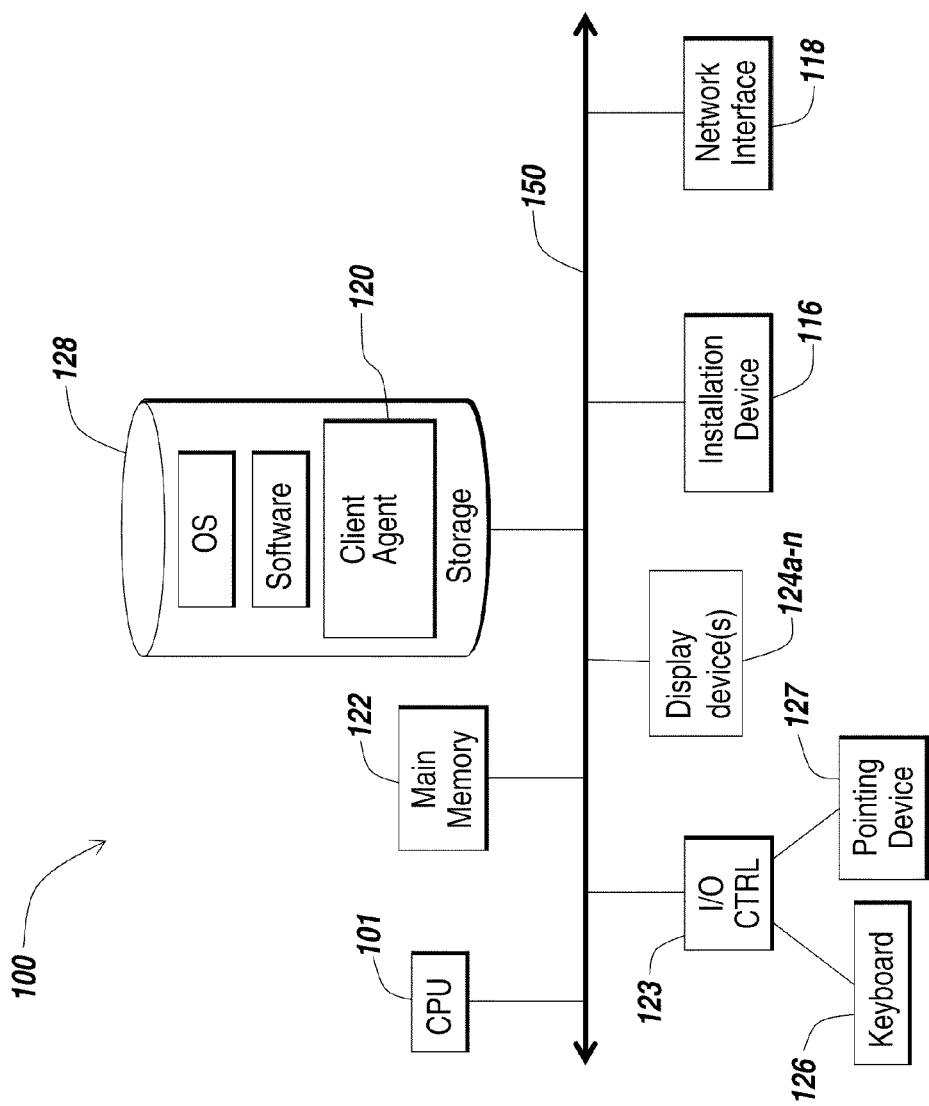
FIGS. 1E and 1F are block diagrams of embodiments of a computing device.
Figure 1F:
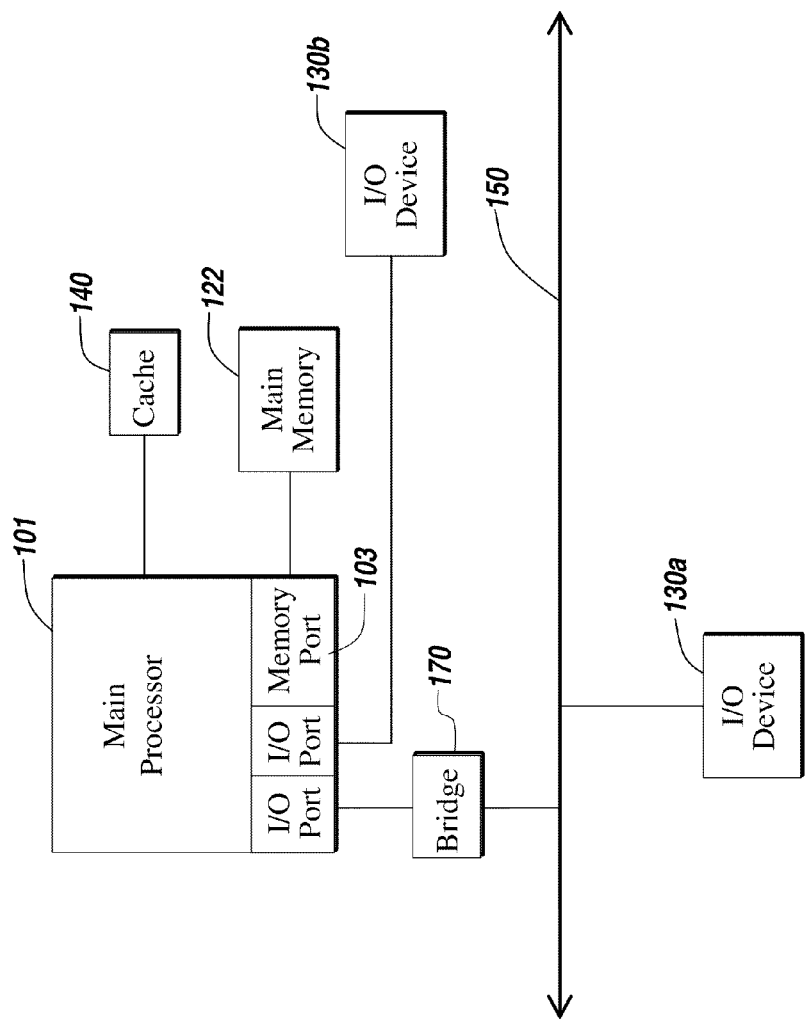

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
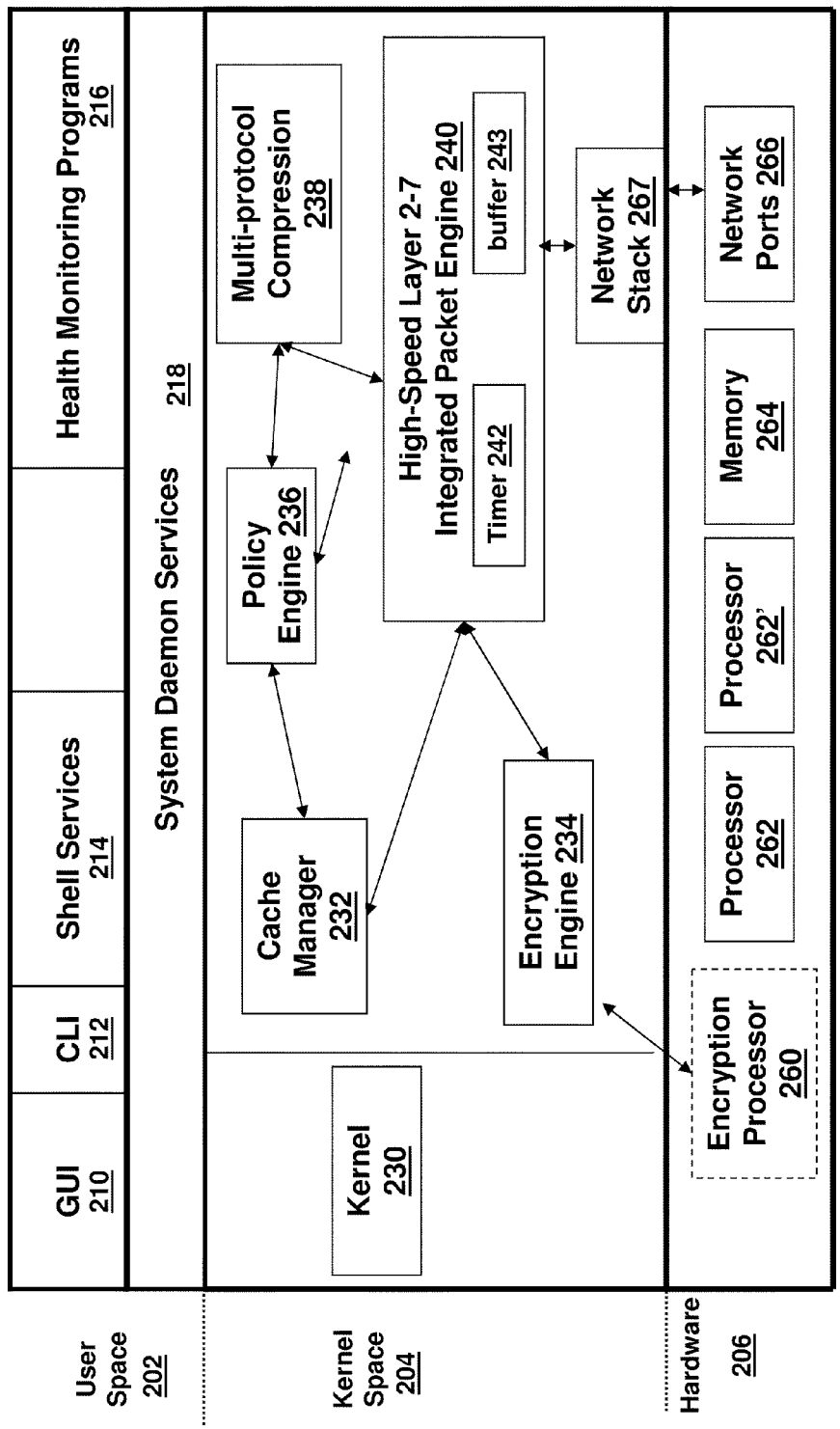
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application (s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
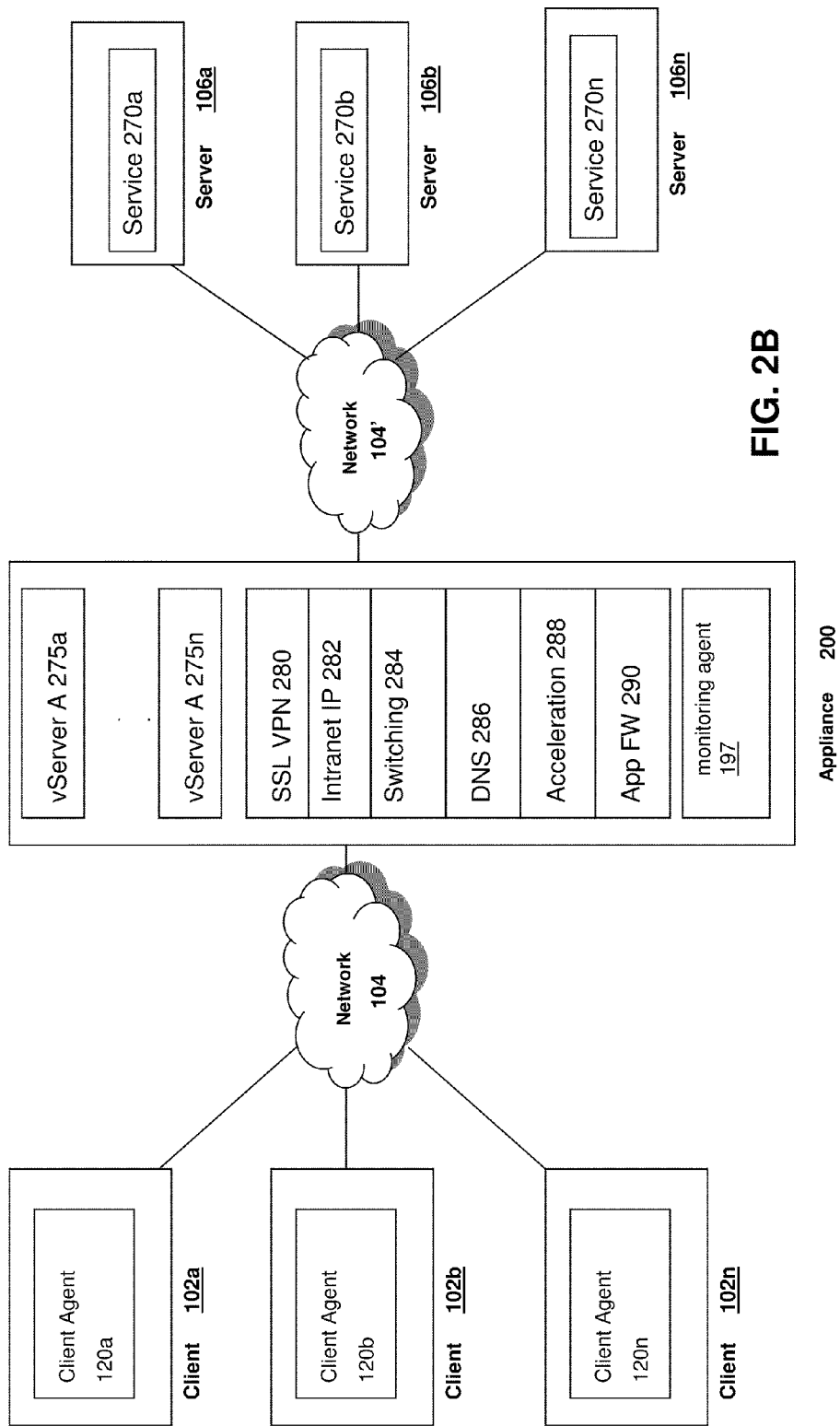
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLS) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
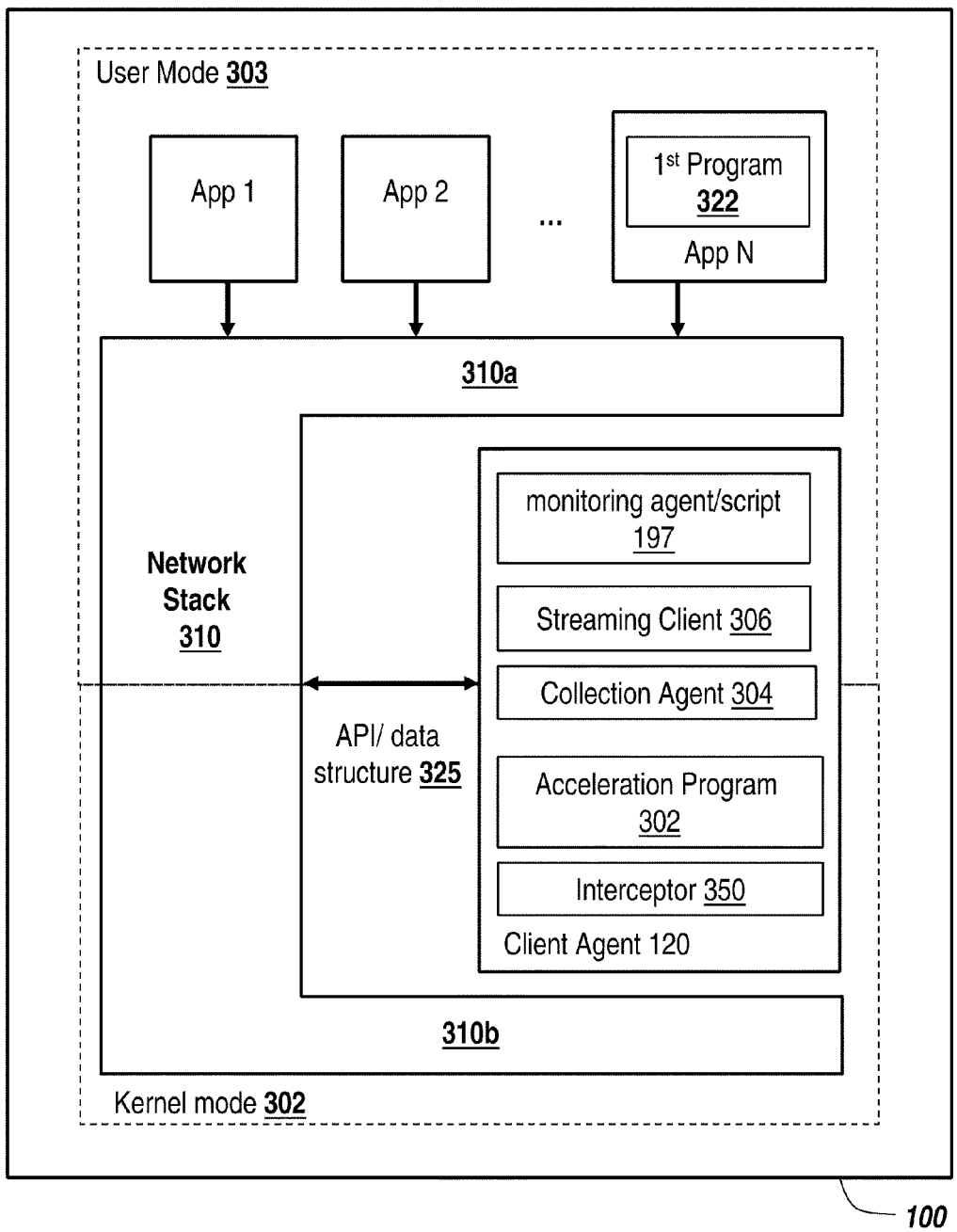
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/ or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106.

In another embodiment, the client agent 120 includes a collection agent 304 for performing end-point detection/ scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120. For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or a portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Visualizer Tool

Some embodiments of an intermediary device 200 described above in connection with FIGS. 1A-D and 2A-B may include an application and/service delivery controller (ADC). The ADC may provide one or more services to manage traffic between a plurality of clients 102 and the plurality of servers 106. The ADC may provide the one or more services via one or more applications and/or vServers 275 of the intermediary device 200. Each of the one or more applications and/or vServers 275 may manage and/or provide one or more services 270. In some embodiments, an application may include and/or manage one or more vServers 275.

An application may include any logic, functionality, hardware and software components for managing and/or providing the one or more services. An application may refer to a bundle of services that performs a function or a related set of functions. An application may be configured to manage, deploy and/or provide functionality for at least one of: content switching, traffic management, load balancing, content rewriting (e.g., HTML injection), cache redirection, data acceleration (e.g. SSL acceleration), security and application firewall (e.g., support for Federal Information Processing Standard (FIPS)), health monitoring, secure sockets layer virtual private network (SSL VPN) and domain name system (DNS). An application may include or identify one or more public endpoints to receive requests that users direct to an application (e.g., from the users' web browsers). Each public endpoint may be identified by at least one of a virtual IP address (VIP) and a port number. A VIP can be an IP address that a DNS server resolves to, such as when processing a Web application URL (i.e., when a user requests the application from a browser). For each application, an administrator can configure one or more VIPs to represent the DNS-resolved destinations for requests to access an application.

An application may include or identify one or more backend services 270 to receive and/or process user requests. The one or more backend services 270 may be provided by one or more backend servers 106 and/or vServers 275. Each backend service 270 may be identified by at least one of a destination IP address and a port number. An application may also include a set of application units. Each application unit may be assigned a subset of the application's public endpoints and backend services. An application unit may include a rule (such as an expression or policy) for identifying a subset of traffic to be processed via the intermediary device 200. For example and in one embodiment, a rule for one application unit may identify requests for image files. A rule for another application unit may identify requests for text files. Each application unit may also include one or more rules or policies to determine operations to be performed on traffic that the application unit processes. Each application unit may include (i.e., be bound to) one or more services to process the traffic. In combination, the application units of an application can perform complex processing of traffic, such as traffic processing for a web application. For example and in one embodiment, an application may be defined for a Customer Relationship Management (CRM) system that performs at least one of the following operations:

Receive requests that users send to the CRM application.
Cache purchase orders (e.g., dynamic caching).
Compress HTML files that are larger than 10 KB.
Rewrite the server response headers in all responses from the target application to hide the identity of the host computer.
Cache static content (e.g., images and JavaScript files).
Avoid caching messaging or calendar information.
Protect against cross-site scripting and SQL injection attacks against the application.

A service managed by an application and/or a vServer 275 may provide any form or type of feature or functionality in connection with traffic management and/or processing. The following lists examples of embodiments of types of services but are not intended to be limiting in any way:

HTTP. In some embodiments, this is a service type that enables the Layer 7 benefits for HTTP connections such as compression, content filtering, caching, and/or Client Keep Alive, an administrator can configure services and virtual servers of type HTTP.
SSL: In some embodiments, this is a service type for configuring an appliance to encrypt and decrypt (offload) SSL traffic.
FTP: In some embodiments, this is a service type for enabling the appliance to support the FTP protocol.
SSL_TCP: In some embodiments, this is a service type for non-HTTP-based SSL services and virtual servers.
UDP: In some embodiments, this is a service type for User Datagram Protocol services and virtual servers.
SSL_BRIDGE: In some embodiments, this is a service type for services and virtual servers using the SSL protocol when the administrator may prefer not to have the appliance encrypt or decrypt the SSL traffic.
NNTP: In some embodiments, this is a service type for Network News Transfer Protocol services or virtual servers, typically used for Usenet.
DNS: In some embodiments, this is a service type for Domain Name System services and virtual servers.
SIP-UDP: In some embodiments, this is a service type for UDP-based Session Initiation Protocol (SIP) connections. SIP can initiate, manage and/or terminate multimedia communications sessions and is one standard for Internet telephony (VoIP).
DNS-TCP: In some embodiments, this is a service type for enabling the appliance to act as a proxy for TCP traffic sent to DNS severs.
RTSP: In some embodiments, this is a service type for Real Time Streaming Protocol services and virtual servers. RTSP can provide delivery of multimedia and other streaming data.
DHCPRA: In some embodiments, this is a service type for Dynamic Host Configuration Protocol (DHCP) services and virtual servers. The DHCPRA service type can be used to relay DHCP requests and responses between VLANs.

In some embodiments, an administrator may refer to a bundle of services that performs a function or a related set of functions via a vServer 275. The administrator may configure and/or manage the bundle of services via a vServer 275 rather than an application as described above. For example and in one embodiment, an application may be defined for a bundle of services that do not involve a vServer 275. In some embodiments, an application that include only one vServer 275 may be configured and/or managed via the vServer 275. A vServer 275 may be configured to manage, deploy and/or provide functionality for at least one of: content switching, traffic management, load balancing, content rewriting (e.g., HTML injection), cache redirection, data acceleration (e.g. SSL acceleration), security and application firewall (e.g., support for Federal Information Processing Standard), health monitoring, SSL VPN and DNS. A vServer 275 may be configured to provide all or a subset of the features and functions of an application described above.

Figure 4A:
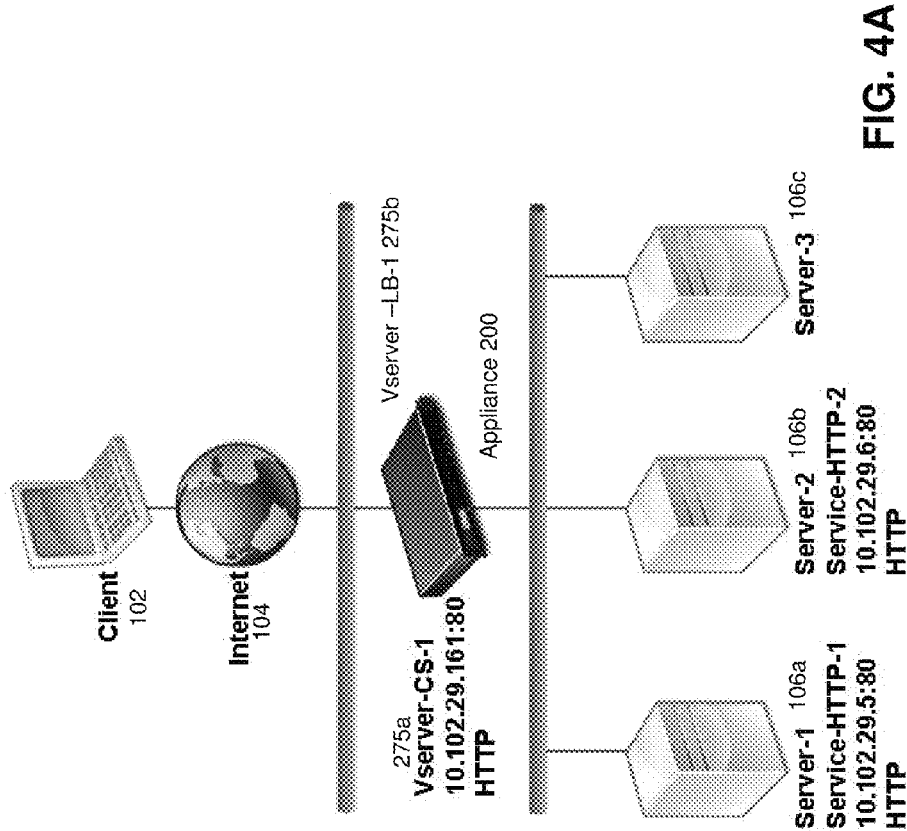
FIGS. 4A-4D are block diagrams of embodiments of a content switching deployment provided by the appliance.
Figure 4B:
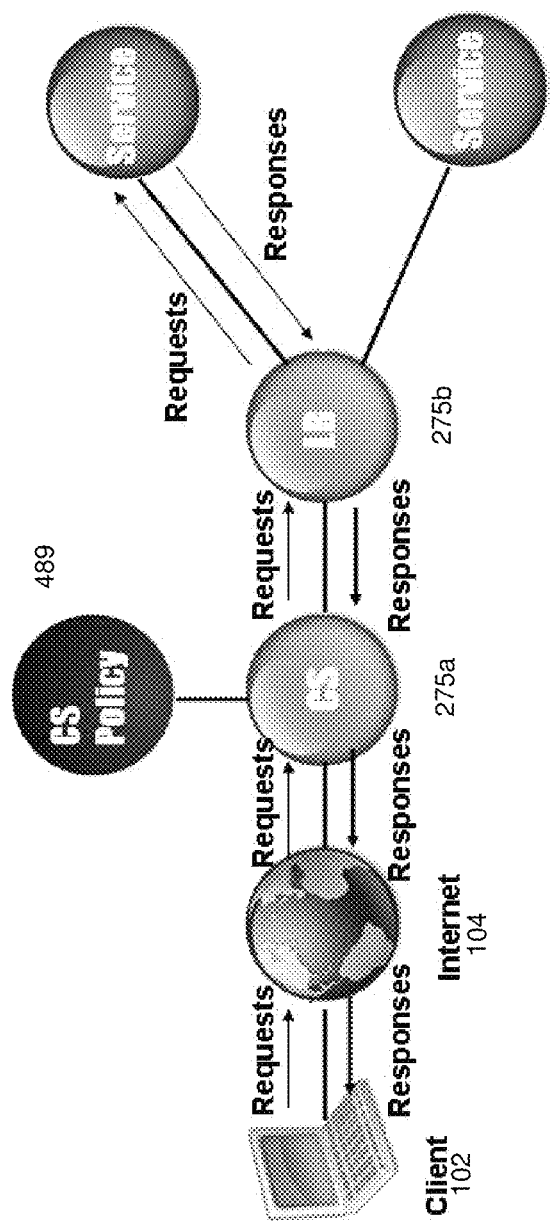

By way of illustration and not intended to be limiting in any way, FIGS. 4A and 4B are embodiments of a content switching deployment configured with a plurality of entities. The content switching deployment may include a content-switching vServer 275a in communication with, or managing a load-balancing vServer 275b. The content-switching vServer 275a may further manage services (e.g., service-HTTP-1 and service-HTTP-2) provided by two or more servers 106a-106c. One or more policies 489 may be bound to the content-switching vServer 275a. These policies may be configured prior to deployment, for example, by assigning a priority to each of the policies 489. Requests for content by a client 102 may be processed by the content-switching vServer 275a, for example, via application of the one or more policies 489. The load-balancing vServer 275b may then balance the load on the services by directing the requests to one or more of the servers 106a-106c to distribute the number of requests processed by each of the servers 106a-106c. In some embodiments, if an external load balancer is deployed instead of load-balancing functionality from the appliance 200, a load-balancing vServer 275b may be created on the appliance for binding to the external load-balancer.

By way of illustration and not intended to be limiting in any way, Table 1 summarize a sample content switching configuration.

TABLE 1

Sample content switching configuration

| Entity type | Name | IP Address | Port | Protocol |
|---|---|---|---|---|
| Vserver | Vserver-CS-1 | 10.102.29.161 | 80 | HTTP |
|  | Vserver-LB-1 | 10.102.29.60 | 80 | HTTP |
| Services | Service-HTTP-1 | 10.102.29.5 | 8083 | HTTP |
|  | Service-HTTP-2 | 10.102.29.6 | 80 | HTTP |
| Monitors | Default | None | None | None |

Figure 4C:
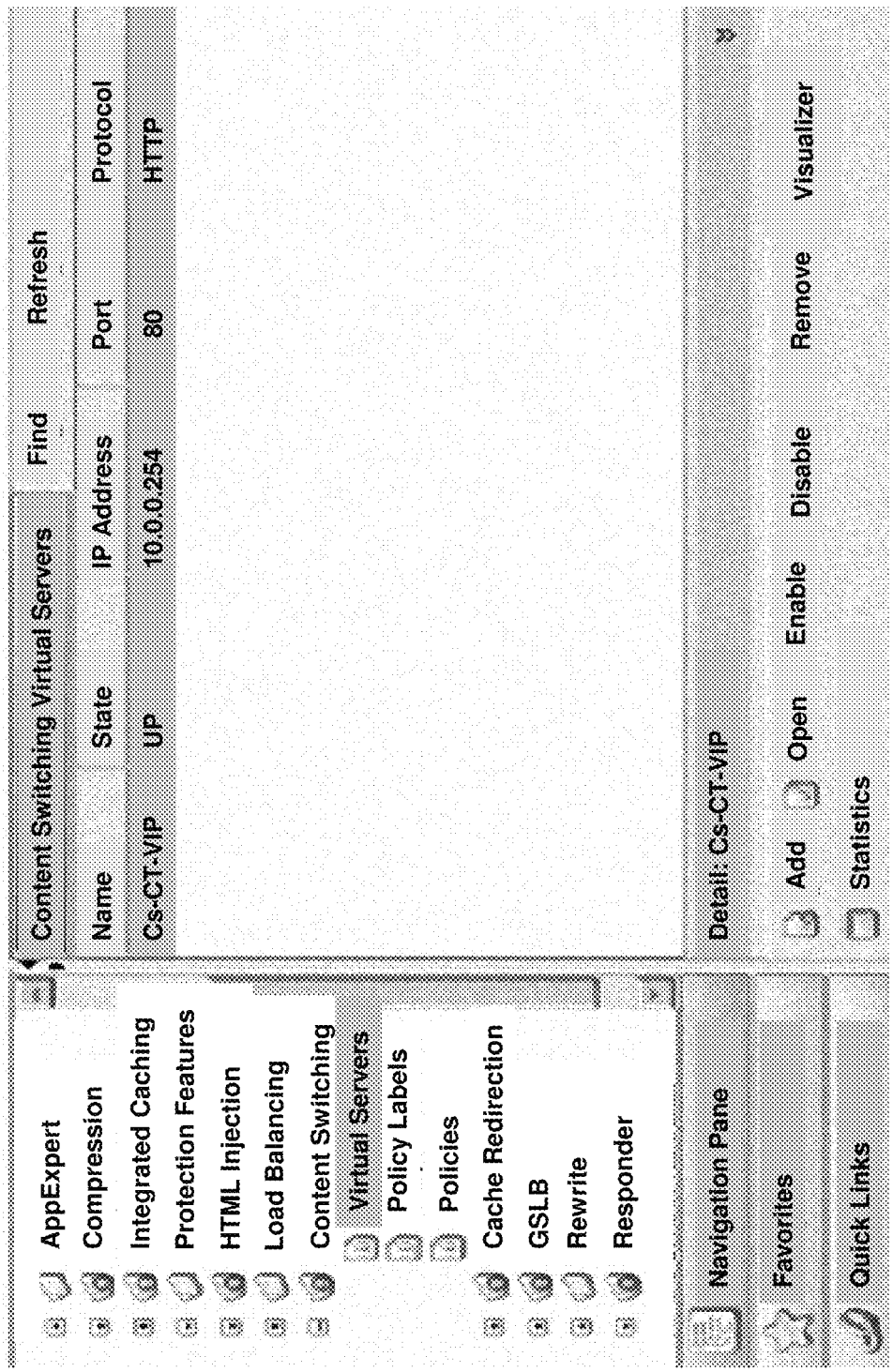
Figure 4D:
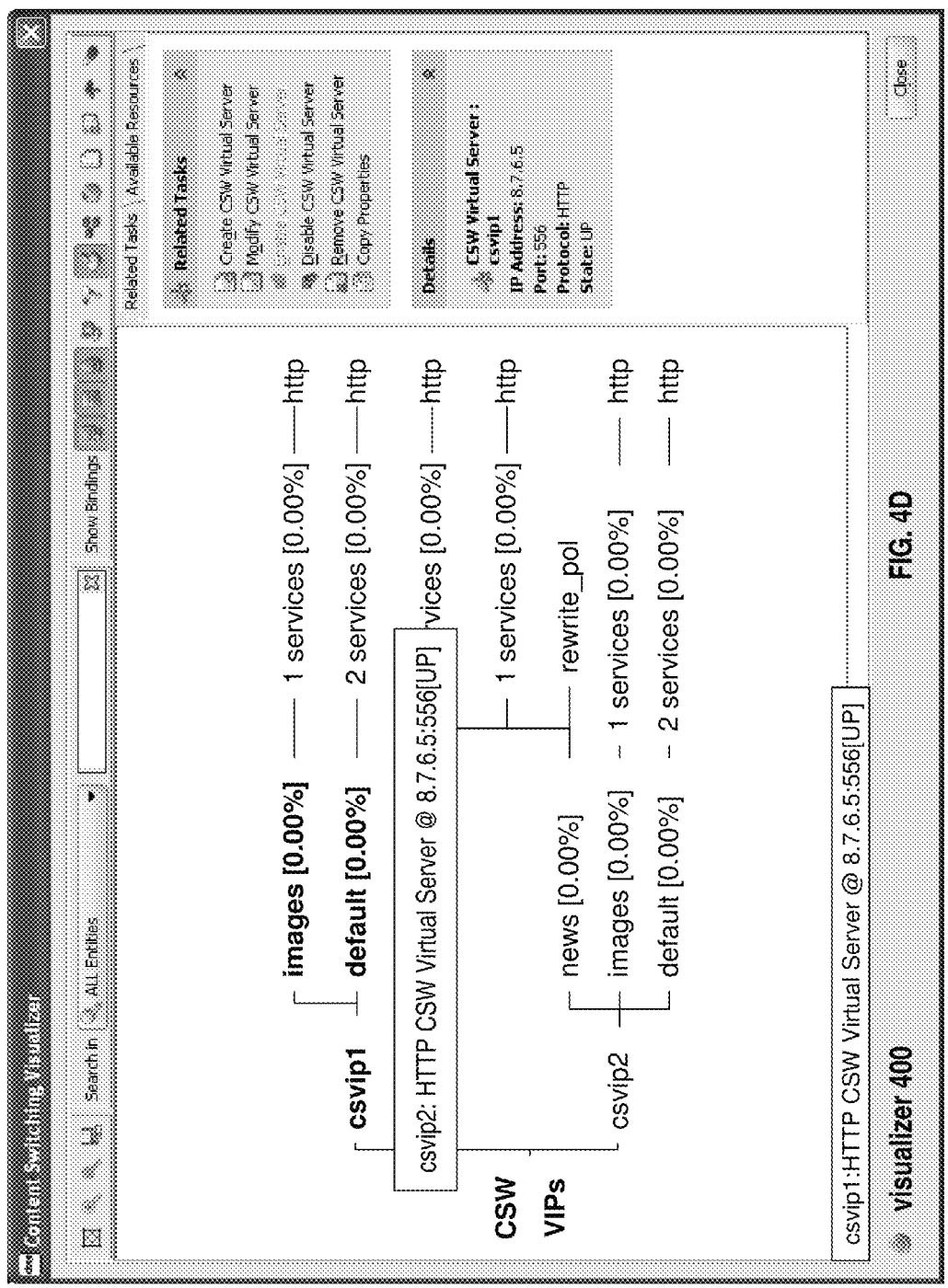

In some embodiments, a vServer 275 is identified by a virtual IP address (VIP). The virtual IP address may be mapped to an IP address and port number of the intermediary device 200 providing the vServer 275. The vServer 275 may be associated with a protocol (e.g., HTTP) and/or a state (e.g., UP, DOWN, OUT OF SERVICE or unknown). For a particular function, e.g., content switching (CSW), one or more vServers 275 may be configured to support such a function. Each of these vServers may sometimes be identified by a VIP, as illustrated in FIGS. 4C and 4D. For configuring and managing applications and vServers, an administrator may use a visualization tool 400.

The visualization tool 400 may execute on and be provided by the intermediary device 200. The visualization tool 400 may be provided by the ADC. In some embodiment, the visualization tool 400 may execute on any one or more of a client 102 and/or server 106 in communication with the intermediary device 200 (hereafter sometimes generally referred to as "appliance"). The visualization tool 400 may provide an interface, such as a user interface, to a display terminal of the intermediary device 200 and/or a client operated by an administrator or user. Referring now to FIGS. 4C-4F, embodiments of the visualization tool, sometimes generally referred to as a visualizer or visualizer tool, is depicted. In brief overview, the visualizer 400 provides an interface to view and analyze traffic flow via an appliance, such as traffic managed by any of the vServers 275, applications and/or modules of the appliance 200. The visualizer 400 is a tool that may be used by an administrator to view traffic flow and/or appliance configuration in one of a plurality of formats, such as using graphical (e.g., WINDOWS-based), tabular, report-based, and/or command-line log representations. The user may also take certain actions via the visualizer 400 to change or otherwise update the configuration of at least one of: the appliance 200, the ADC, an application, a vServer, a backend server 106 providing a service, and a service.

In further details, the visualizer 400 may comprise any type and form of executable instructions to provide any type and form of user interface. The visualizer 400 may comprise any type and form of interface to access, communication with and/or obtain information from any of the applications, vServers, and/or modules, components or logic of the appliance 200, such as any components of the appliance illustrated in FIG. 2A and/or FIG. 2B. The visualizer 400 can comprise logic, functions and/or operations to access and provide information on configuration, management and use of any of the entities supported by or provided by the appliance 200, including but not limited to vServers, virtual IPs, services, applications and monitoring agents. The visualizer 400 may comprise logic, functions and/or operations to access and provide information on any performance and/or operational characteristics of any feature, functionality and/or element provided via the appliance 200. The visualizer 400 may comprise logic, functions and/or operations to access and provide information on any user or group of users associated with an application, a vServer, the plurality of clients 102 and/or traffic managed by the appliance 200.

In some embodiments, the visualizer provides, or is part of, a unified management user interface to any and/or all of the functions, logic or operations supported or provided by the appliance, including but not limited to content switching, traffic management, data acceleration, load balancing, security and application firewall, policies, health monitoring, SSL VPN and DNS. Furthermore, the appliance 200 may be deployed with any number of servers, applications, networks, services and users and group of users. With the scalability and extensibility of the appliance to support a wide variety of environments of different complexities, the corresponding configuration, management and use of the appliance 200 may be relatively complex. The visualizer tool 400 may include an interface and tool for assisting an administrator to determine the configured functionality of the appliance and/or to assist the administrator in applying functionality that have not yet been configured.

Referring to FIG. 4C, a user interface representing one embodiment of a navigation pane of a unified management user interface is shown. The navigation pane may provide a listing of functionalities provided by the appliance 200, such as cache redirection, content switching and load balancing, for selection. A user can select and/or expand each of these functionalities to present or otherwise reveal additional information, such as virtual servers and policies associated the selected functionalities. A user can select and open the configuration of any of the entities for change. An administrator may identify an application and/or vServer for providing a selected functionality. The configuration of the application or vServer may be displayed in the navigation pane in substantially textual and/or tabular format. The navigation pane may provide an icon, button or widget for invoking the visualizer that can graphically present at least some portion of the configuration. In some embodiments, some functionalities may be achieved either via the navigation pane or the visualizer 400 of a management user interface. For example and in one embodiment, an administrator may access the same information and/or make a configuration update via either the navigation pane or the visualizer 400. In some embodiments, it may be more intuitive, user friendly and/or efficient to operate via the visualizer 400.

In some embodiments, the visualizer 400 provides an interface for displaying relationships between the different features, functionalities and/or entities (e.g., policies, vServers 275, VIPs, monitoring functions and services) configured and/or provided via the appliance 200. The relationships may include relationships associated within and/or between applications and/or vServers 275. The visualizer 400 may provide an informative graphical visualization of the configuration relationship between different entities. The visualizer 400 may show relationships between entities using any type and form of graphics, including but not limited to a variety of icons, symbols, shapes and/or colored lines. The visualizer 400 may show a status of a configuration of any entity using any type and form of graphics, including but not limited to a variety of icons, symbols, and other shaped and/or colored user interface elements. The visualizer 400 may show a status of operation and/or performance of any entity or module of the application using any type and form of graphics, including but not limited to a variety of icons, symbols, and other shaped and/or colored user interface elements. The visualizer 400 may use any type and form of user interface elements or widgets, such as dialogs, popups, etc. to provide alerts and any other condition notification or status information.

In some embodiments, the visualizer 400 can obtain and/or display any type and form of statistical information about the performance and/or operation of the appliance 200. For example, in one embodiment, the visualizer 400 displays statistical information on receipt and/or transmission of network packets via the intermediary 200 and/or any vServer, for example, first order and second order rate information, bandwidth information, and/or packet loss information. In some embodiments, the visualizer 400 displays statistical information on the use of any service, vServer or application. In certain embodiments, the visualizer 400 displays statistical information on a user's usage of the appliance and/or applications or services provided via the appliance 200. The statistical information may include CPU usage and/or memory usage. The statistical information may include the number of times a policy was applied, the number of times a policy action was activated, the number of requests and/or responses, the amount of traffic (e.g., in bytes), throughput (e.g., in Mbps), and/or the number of client connections. As and example, FIG. 4H shows one embodiment of a display of statistical information related to an application and provided by the visualizer 400. The display may also include information such as the application name and/or public endpoint identifier, state of the public endpoint, system log, the number of requests per time period, the application units, the state of each application unit, and health monitoring for the application units.

In some embodiments, the visualizer displays the configuration and entity relationships in a visual format that is easy to understand and/or user-friendly to a user. In some embodiments, the visualizer aids an administrator in making decisions by providing a visual display of the configuration and/or status of the appliance, application. vServer 275, service an/or other entity. The visualizer 500 may comprise any type and form of user interface elements or widgets for the user to access or interact with the configuration of the appliance. For example, a user may select an entity in the display and then select from any type and form of menu one or more actions to take with respect to the selected entity. In some embodiments, the visualizer 400 may provide any type and form of user interface to assist, guide or prompt a user to add, change and/or delete an entity or any portion of an entity's configuration. In some embodiments, the visualizer 400 provides any type and form of user interface wizard or help widget for guiding a user through steps to add, change or delete any portion of the configuration. For example, in one embodiment, the visualizer 400 may provide a wizard to guide a user to apply recommended, suggested or desired optimization and security configuration actions, e.g., actions for addition, deletion or modification. The visualizer 400 may provide an interface to, or visual display of, any configuration, operational and/or performance data of any entities via the use of application template features of the appliance. The application template features can include any embodiments of appliance features as described in commonly owned U.S. patent application Ser. No. 61/113,766, entitled "Systems and Methods For Application Fluency Policies", which is incorporated herein in its entirety. In some embodiments, an application template provides a data and/or graphical structure for arranging and/or presenting configuration and/or operational and/or performance data. In one embodiment, an administrator can export an application's configuration to an application template file. This application template file may be reused on another entity by reusing some or all of the configuration data exported into the template file. The application template file may be fully or partially populated and/or rewritten with imported data for a new or different entity. In view of some of these embodiments, the visualizer may provide a snapshot encapsulation of the configuration specific to a given application, vServer, VIP, application or service. For example, in some embodiments, an application template may include at least one of the following:

1) The application components (e.g., pages, files, archives, Web Services) that an appliance is designed or configured to process;

2) The traffic management entities (e.g., vServers/VIPs and associated load-balancing algorithms, health checks, persistence methods, SSL offload settings) for these application components; and 3) The policies for content caching, compression, rewrite and other appliance functionality used to optimize and/or accelerate processing by an application and/application components.

With the use of Application Templates, the visualizer 400 may generate a high level, concise and/or consolidated view of everything the appliance is doing or is configured to do for a given application or other entity. From a single user interface provided the visualizer, an administrator can manage, maintain and/or change the appliance configuration for an entity in a substantially standardized and/or familiar way. Such a unified management interface can provide a framework for administrators and peers in application groups to work together whilst supporting evolution of existing applications and addition of new applications to the appliance.

Figure 4E:
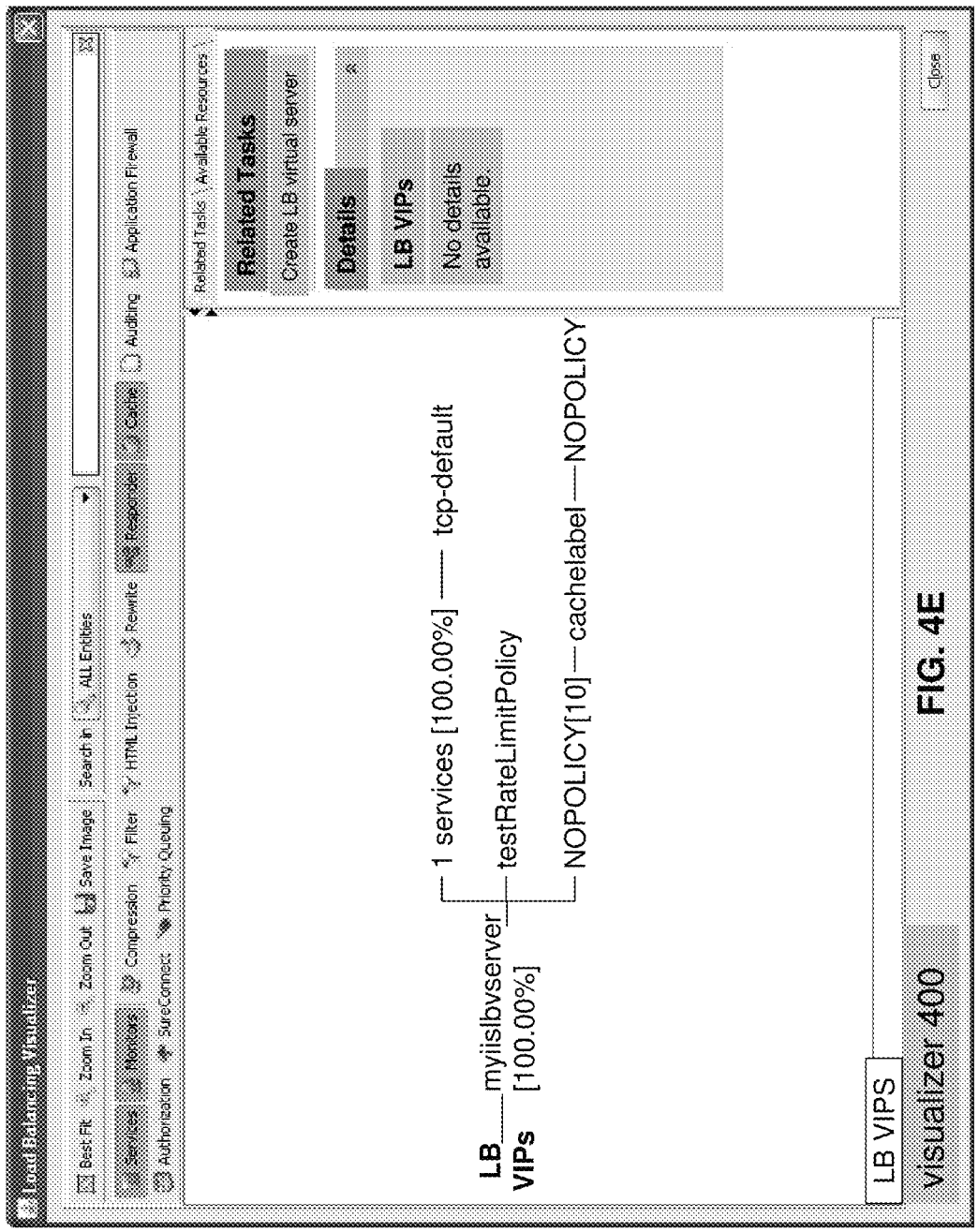
FIG. 4E is a block diagram of an embodiment of a load balancing deployment provided by the appliance.
Figure 4F:
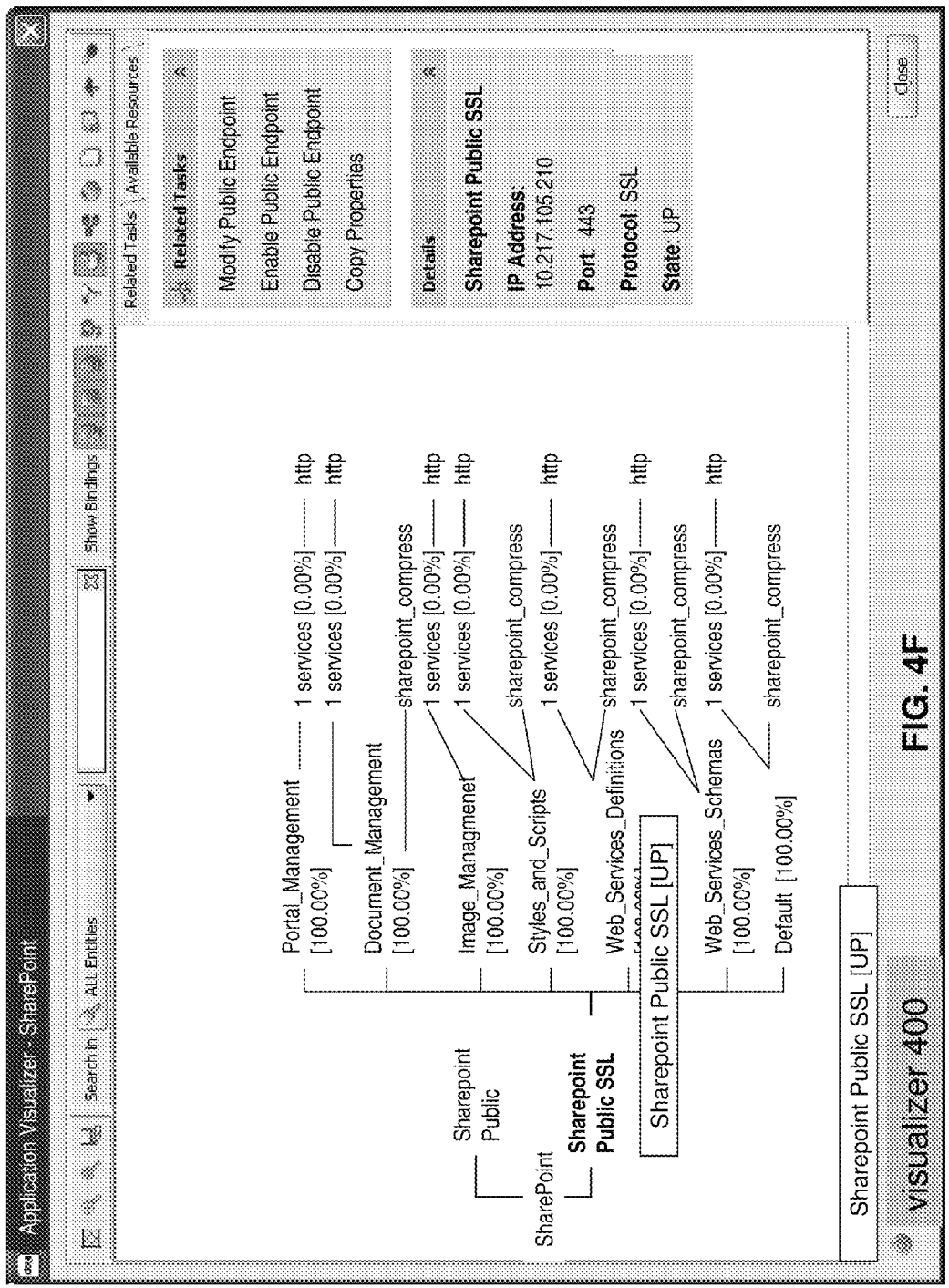
FIG. 4F is a block diagram of an embodiment of an application deployment provided via the appliance.

Still referring to FIGS. 4D-4F and in some embodiments, the visualizer 400 may generate a graphical representation of entities and/or configuration properties based on a tree structure. The tree structure may display and/or communicate any parent and child relationship between configured entities and/or properties of the appliance 200. A parent entity may contain or support relationships with multiple child entities and any child entity may in turn have child relationships with other entities. In some embodiments, for example, a child entity, such as a service, can only be assigned to one service container associated with a parent vServer 275. For example, in one embodiment, the appliance 200 may be configured to have a content switching virtual server 275a as a parent that has one or more load balancing virtual servers 275a-275n that distributes traffic. These load balancing virtual servers may in turn have backend services and these services may have monitors as their children. An administrator may identify the traffic flow by looking at the graphical representation of the configuration via the visualizer 400. By using the visualizer, one may determine the kind of traffic being processed and the status of backend services.

In some embodiments, the visualizer is used to modify an existing configuration of an entity without navigating or going into another configuration tool or utility. It should be understood that the visualizer tool may provide some or all of the functions of other configuration tools or utilities. In some embodiments, the visualizer 400 may be launched, initiated or executed from any location (e.g., from a remote client device) or via an interface element of another configuration utility, tool or user interface. For example and in one embodiment, an administrator may access a configuration utility for the application and navigate to a view of a content switching virtual server element in the configuration utility. The user may then select the content switching virtual server from this view and click on a widget to launch the Visualizer. This user action invokes and launches the Visualizer tool 400, which in some embodiments can be resized by the user.

In some embodiments, the visualizer may include any type and form of logic, function, operation or system to validate or audit a configuration. The visualizer may check for or detect configuration mistakes or issues and/or display any of these configuration issues to a user or administrator. For example, in some embodiments, services that are designated for load balancing (e.g., in a load balancing service group or service container) should have a similar configuration. That is, in some embodiments, the parameters of the services and/or service groups bound to a load balancing virtual server should be substantially similar. As another example, monitor bindings to services and/or service groups bound to a load balancing virtual server may be the same or substantially similar in various embodiments. In some of these embodiments, each service has the same monitors of the same weight and binding state bound to the service.

In some embodiments, the visualizer 400 combines or consolidates all similar services and service groups into a service container. The visualizer may represent the service container as a child entity connected to a parent entity (e.g., a load balancing virtual server). In some embodiments, a service container refers to a set, group or collection of similar or related services and/or service groups. A service group may be any logical or virtual grouping of similar or related services (e.g., even if the servers providing the services are physically unrelated, geographically separate or of different hardware).

In some embodiments, if a load balancing virtual server has more than service containers representing a common set of configuration properties, then the visualizer 400 may indicate an incorrect configuration using any type and form of graphical alert or user interface element. For a given configuration issue, the visualizer 400 may provide an indicator consistent with the level of severity of the configuration issue. The indicator may be of any type and form of color, object, text and/or visual design that provide an indication of the appropriate notification for the configuration issue.

An administrator may correct, update or modify a configuration of a first service container by selecting a second service container with a suitable configuration and applying the second service container's configuration to the first service container. The visualizer may indicate or otherwise display the number of services and service groups that a service container contains. The visualizer may also present health monitoring data for any one or more services of a service container in any visual or graphical format. For example and in one embodiment, the health monitoring data may include a percentage of services with a state of "UP" (i.e., active state) based on the total number of available services. The visualizer may use any color coding, textual descriptions, symbols and/or graphics to indicate the state or status of service (e.g., indicating if a service is "UP" or "DOWN"). For example and in one embodiment, if the service container status icon is green, this icon color may indicate that all services and/or service groups in this service container are "UP" and/or "ENABLED". In another embodiment and example, if the icon color is red, this may indicate that all of the services are DOWN. In a further embodiment and example, a yellow service container icon may indicate that the services are out of service. In still another embodiment and example, a gray indicator may indicate a mixed set of service states (e.g., of UP, DOWN and/or out of service).

The visualizer 400 may present or display an aesthetically pleasing and/or user friendly user interface or interactive environment. In one embodiment, the visualizer may use curved edges to indicate a relationship (e.g., parent-child relationship), property (e.g., a vServer configured with a monitor or monitoring function) or binding (e.g., a first vServer bound to a second vServer). In one embodiment, the visualizer may use straight and/or dotted edges to indicate a relationship, property or binding. The visualizer may use different types of connectors and/or edges to indicate any desired relationship.

The user interface of the visualizer 400 may be organized to provide one or more functional sections. For example, referring to the embodiments shown in FIGS. 4D-4F, the user interface may provide four major functional sections. A top panel or section may include one or more menus for providing selections embodied as a plurality of icons or graphical elements. The center panel may include a main visualizer view showing a configuration and/or status view of an application or vServer. A right panel may include a user interface for processing related tasks and presenting detailed information. A bottom panel may include any type and form of status bar for displaying messages.

In further details, the top panel section of the visualizer may include a plurality of elements for initiating a number of operations. Some of these elements, such as the first set of four icons at the top left corner, are action buttons for image control and capture: Best Fit/Zoom-in/Zoom-out/Save Image. The Best Fit element may be used to restore or set to a default display size for a graphical view. The Zoom-in element may be used to increase the size of the graphical elements in a graphical view. The Zoom-out element may be used to decrease the size of the graphical elements in a graphical view. The Save Image element may be used to capture and/or save the image of graphical view to a storage device. The top panel may also include a search utility using any type and form of interface for searching databases, cached information, or displayed data. For example and in one embodiment, the search utility may be used to find an entity in the graphical representation. A search may be restricted or limited to a specific type of entity by selecting the entity-type in a drop down menu element. A user, such as an administrator, may type one or more characters in a provided text field to specify a search string. Entities found having or satisfying the specified search string may be highlighted by the visualizer within the graphical view.

The top panel may also include a show bindings user interface element, which upon selection, displays the entities relationships. For example, as illustrated in FIG. 4D, activating show bindings in the visualizer 400 may present the content switching virtual server 275 as a parent node of a tree structure showing all of its entity relationships. In another content switching example, the show bindings action may display the content switching virtual server connected to one or more load balancing virtual servers, service containers and monitors. If an administrator desires to see policies configuration, the administrator may select an appropriate option of the Show Bindings menu to view such information. In some embodiments, the top panel may also include an icon button for each type of entity (e.g., a rewrite policy). For example and in one embodiment, an administrator can select or deselect a Rewrite Policy icon to respectively display or hide bound rewrite policies in a graphical view.

In further details, the center panel includes a viewing area or space where a visual representation of the configuration can be displayed showing the relationships between entities. The visual representation may include any type and form of graphical format with nodes and connectors. Each entity may be represented by a node and bindings may be represented by connecting edges between a parent entity and a child entity. Any type or form of icon or graphical element may be used for a node to represent an entity. The nodes may comprise different shapes and/or colors to represent different entity types, status or operational and/or performance characteristics.

A node may comprise any number of configuration properties or attributes. In some embodiments, the node may comprises one or more of the following properties:
1. A node may be a representation of an entity such as an application, a vServer, a VIP, an application unit, a policy, a monitor, a service container and a protocol type.
2. A node may be represented by one of a plurality of icons to identity the type of the corresponding entity.
3. A node may have overlaid icons or indicators to identify the state of the corresponding entity (Ex: Green for UP, Red for DOWN and Yellow for Out of Service).
4. A mouse over on a node may highlight that node as well as connected nodes.
5. A mouse over on a node may highlight connected parent and child nodes in different edge colors.
6. A mouse over on a node may reveal information about the corresponding entity in the form of a tool tip.
7. A mouse over on a node may reveal health information of the corresponding entity in a status bar. For example and in one embodiment, the health of a load balancing virtual server may represent a percentage of UP services against all bound services.
8. Clicking on a node can select the corresponding entity.
9. Clicking on a node may display the related tasks and details of the corresponding entity in a right panel of the visualizer user interface.
10. A right click on a node may show a popup menu that presents available actions on the corresponding entity.
11. A double click on a node can present the corresponding entity in modify mode.

In showing relationships between entities, the visualizer 400 may use any type and form of line, connector or edge to indicate a connection, binding or relationship between a pair of entities.

The edge may comprise some or all of the following properties:
1. An edge can be a representation of binding between two entities.
2. A mouse over on an edge may highlight that edge.
3. A mouse over on an edge may highlight a connected parent node and a connected child node.
4. A mouse over on an edge may show binding information about that edge (such as a priority and/or weight of the binding).
5. Clicking on an edge can select that edge.
6. Clicking on an edge can display the related tasks and details of that edge in a right panel of the visualizer user interface.
7. A right click on an edge may show a popup menu that presents available actions on that edge.
8. If an edge is selected and a delete key is pressed, this combination of actions may unbind the corresponding binding (i.e., delete the selected relationship).

In further details, the right panel may be used to show the details and related tasks sections of the visualizer's user interface, of which embodiments are depicted in FIGS. 4D-4F. In some embodiments, contents of the details and related tasks sections may be context sensitive in relation to a selected entity. This user interface may be made up of a plurality of widgets such as a tab for Related Tasks and another tab for Available Resources. In some embodiments, the Related Tasks section displays a list of selectable or executable operations that can be performed on a selected entity or edge. The Details section may be configured to show any level of details of a selected entity or edge.

In some embodiments, the Related Tasks section may provide one or more selectable actions for an entity. By way of illustration in the context of a selected load balancing vServer, one embodiment of selectable actions may include:
Modify: Clicking on this link may open a load balancing virtual server in a modify mode where properties of the virtual server can be changed.
Enable: Clicking on this link may enable the load balancing virtual server.
Disable: Clicking on this link may disable the load balancing virtual server.
Show Bindings: Clicking on this link may show a list of content switching virtual servers from which traffic is coming to the selected load balancing virtual server. Additional bindings, such as bindings to monitors, policies and service containers may be displayed.
Copy Properties: This operation may be generic to more than one entity types. Clicking on this link may copy configuration properties of the load balancing virtual server, for example, in to a template or onto a clipboard that can be imported into supported software applications such as Excel and Notepad.

In some embodiments, the Related Tasks section provides one or more selectable actions for a selected service container, for example:
Modify Properties: Clicking on this link may open a service container in a modify mode where properties of the service container can be changed. Changing the properties of a service container may change the properties of services and/or service groups associated with this container.
Show Member Services: Clicking on this link may show the list of services and/or service groups associated with this container.
Apply Configuration: Clicking on this link may initiate a change in the configuration. In some embodiments, the visualizer may request an administrator for confirmation to apply the configuration change.
Copy Properties: Clicking on this link may copy service container properties to a template or onto a clipboard that can be imported into supported software applications such as Excel and Notepad.

In some embodiments, the Related Tasks section provides one or more selectable actions for an edge between two entities. For an embodiment and example of a binding between a content switching and one or more load balancing virtual servers, the actions may include:
Unbind: Clicking on this link may generate a request to an administrator for confirmation to disconnect the one or more load balancing virtual servers from a parent content switching virtual server. Internally, this action may unbind all content switching (CSW) policies for which the load balancing virtual servers are targets.

In some embodiments, the Related Tasks section provides one or more selectable actions for an edge between a virtual server and a service container. For an embodiment and example of a binding between a load balancing virtual server and a service container, the actions may include:
Unbind: Clicking on this link may generate a request to an administrator for confirmation to unbind all services and service groups present in service container from the parent load balancing virtual server.

In some embodiments, the Related Tasks section provides one or more selectable actions for an edge between a service container and a monitor, for example:

Unbind: Clicking on this link may generate a request to an administrator for confirmation to unbind a monitor from all services and/or service groups present in the parent service container.

Modify Parameters: Clicking on this link may present a screen where an administrator can change binding parameters such as weight and/or state. This action may change the bindings of all services and/or service groups of the service container to the monitor.

In some embodiments, the Related Tasks section provides one or more selectable actions for an edge between a virtual server and a policy. For an embodiment and example of a binding between a load balancing virtual server and a rewrite policy, the actions may include:

Unbind: Clicking on this link may generate a request to an administrator for confirmation to unbind the rewrite policy from the parent load balancing virtual server.

Modify Parameters: Clicking on this link may present a screen where an administrator can change binding parameters such as priority, goto expression and invocation rules for policies.

Figure 4G:
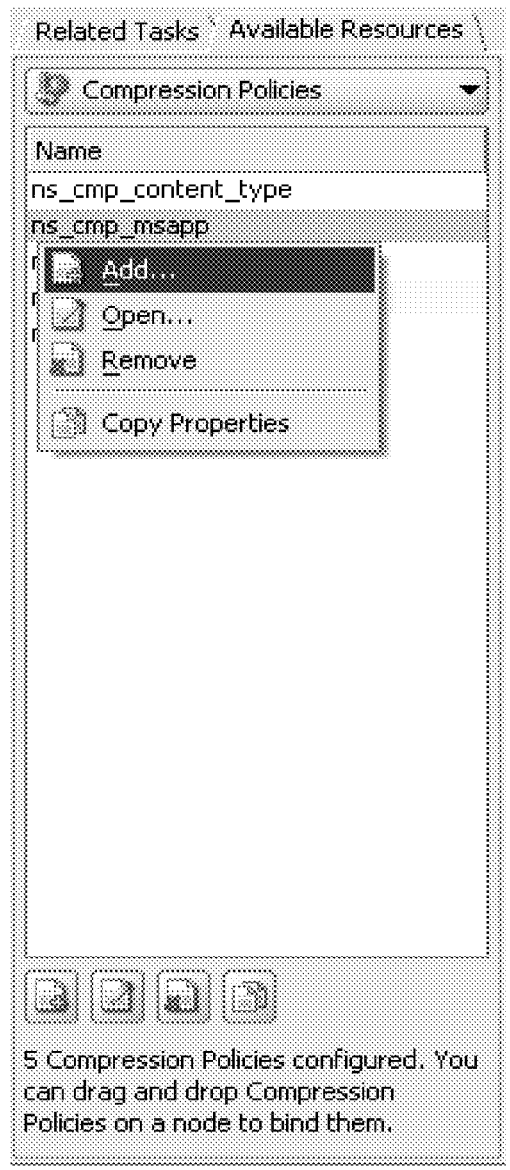
FIG. 4G is an embodiment of an user interface of a visualizer tool for configuring policies of one embodiment of an intermediary.
Figure 4H:
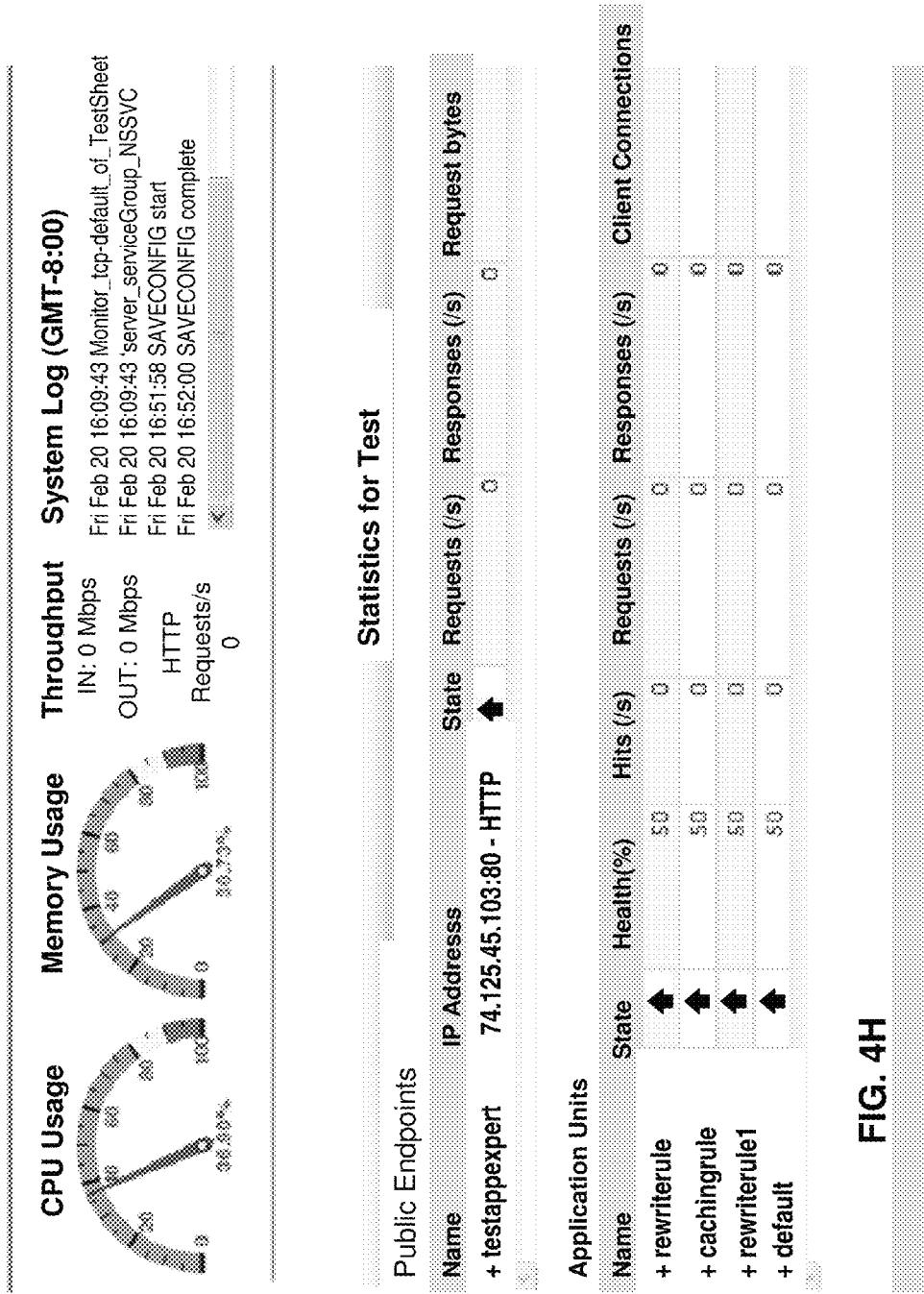
FIG. 4H is an embodiment of an user interface of a visualizer tool for viewing configuration and status information in one embodiment of the appliance.

Referring now to FIG. 4G, one embodiment of a portion of the visualizer user interface is depicted. This portion includes the Related Tasks and Available Resources tabs. In some embodiments, the Available Resources tab may include a drop down menu from which an administrator can select the type of available entities to display and/or modify. The selection of an entity type may create a listing or tabular view of entities corresponding to the selected entity type. The user interface may show the entities and a list of permitted operations on a lower button panel in the form of icons. A right click on a selected entity may display a menu of permitted operations for the selected entity, which may include actions to Add, Open, Remove or Copy Properties of the entity. In other embodiments, operations available may include Create, Modify, Remove, Enable, Disable and Copy Properties.

The visualizer 400 or any portion thereof may be used to connect a new or an additional vServer 275, e.g., connecting a load balancing vServer to a content switching vServer. For example and in one embodiment, the user may perform one or more of the following actions via the Available Resources section of the user interface: (i) select CSW Policies from the drop down menu and then select a CSW policy from the display listing of policies, and (ii) drag the selected policy and drop the selected policy on to a content switching virtual server node in the main display area. Responsive to this drag-and-drop, the visualizer may prompt the user to specify a priority and a target load balancing virtual server. Upon a user confirmation of the configuration change (such as via an OK command button), the selected policy may be bound to that content switching virtual server, In addition, a new load balancing virtual server node corresponding to the target load balancing virtual server may appear in the graphical representation of the configuration. In some cases, a new load balancing virtual server node may not appear if that load balancing virtual server is already connected to the content switching virtual server (i.e., processing traffic).

The visualizer 400 or any portion thereof may be used to bind new services. In some embodiments, the user may perform one or more of the following actions via the Available Resources section of the user interface: (i) select Services from the drop down menu and then select multiple services from listing of available services., and (ii) Drag the selected services and drop these services onto a load balancing virtual server node in the main display area. Responsive to this drag-and-drop, the selected services may be bound to the load balancing virtual server. These services may either be updated to existing service containers or added to newly established service containers based on services' configuration properties.

The visualizer 400 or any portion thereof may be used to bind new monitors. For example, in one embodiment, the user may perform one or more of the following actions via the Available Resources section of the user interface: (i) select Monitors from the drop down menu and then select multiple monitors from the listing of available monitors, and (ii) Drag the selected monitors and drop these monitors onto a service container node. As a result of these actions, all selected monitors are bound to all the services and service groups that are present in that service container.

The visualizer 400 or any portion thereof may be used to bind new policies. For example, in one embodiment, the user may perform the following actions via the visualizer: (i) select desired policy type from drop down, (ii) select multiple policies (multi selection not allowed of rewrite, responder and cache policies) from tabular view and (iii) drag these policies and drop them on to a load balancing or content switching virtual server node. Responsive to this drag-and-drop action, the selected policies may be bound to the load balancing or content switching virtual server. In some embodiments, such as in the case of binding rewrite, responder and cache policies, a drag-and-drop action may prompt the user for additional binding information such as priority information.

In further details, the bottom panel may comprise any type and form of one or more status bars to display status and information messages. For example and in one embodiment, when a node is selected, information about the node may be presented in the status bar. In another example, when a load balancing virtual server is selected, one or both of the following may be displayed via the status bar: health information (percentage of UP services against all bound services) and individual number of UP, DOWN and Out of Service services in their respective colors. In another embodiment, if an edge is selected, binding information like priority and weight information is presented in the status bar.

Figure 5A:
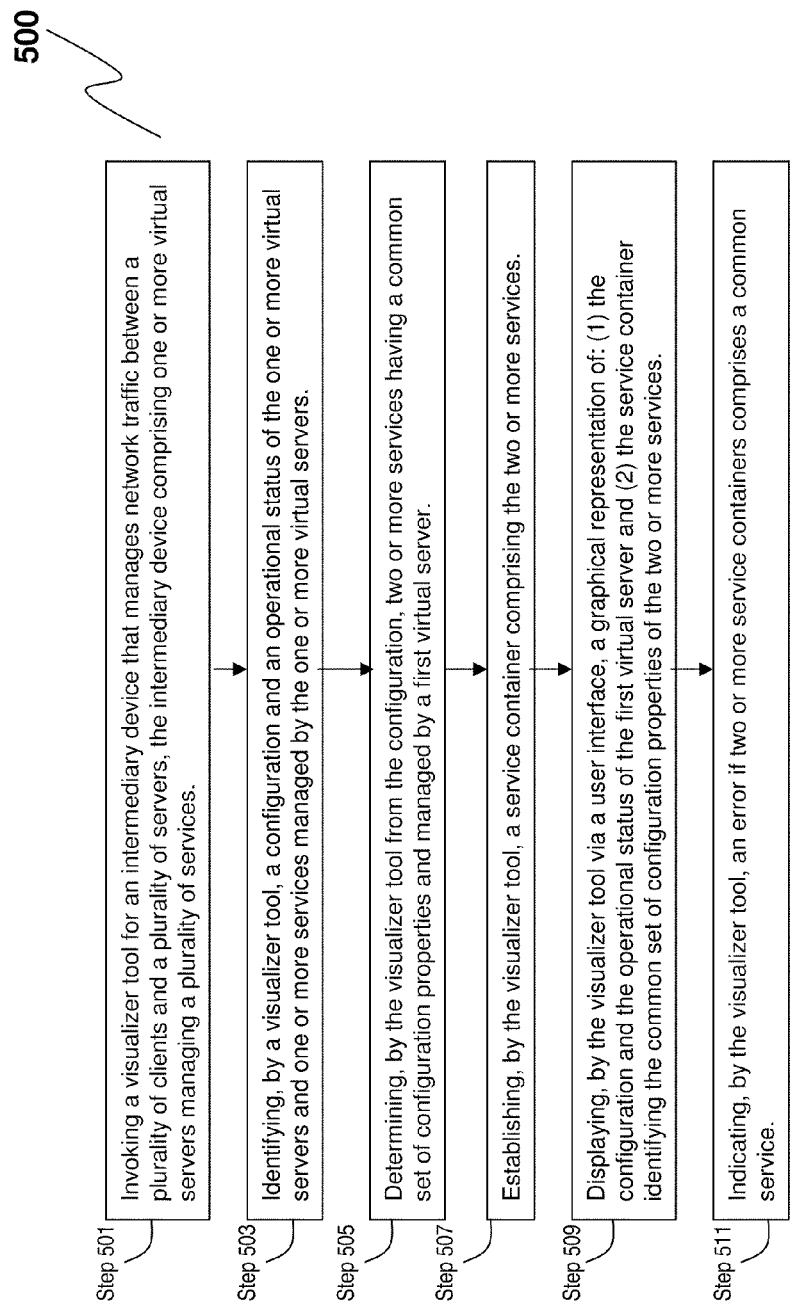
FIG. 5A is a flow diagram of an embodiment of steps of a method for providing management of network services provided by an intermediary device.

Referring now to FIG. 5A, a flow diagram depicting an embodiment of steps of a method of providing management of network services provided by an intermediary device is shown. In brief overview, at step 501, a user invokes a visualizer tool 400 for an intermediary device 200 that manages network traffic between a plurality of clients 102 and a plurality of servers 106. The intermediary device 200 includes one or more virtual servers 275 managing a plurality of services 270. At step 503, the visualizer tool 400 identifies a configuration and an operational status of the one or more virtual servers 275 and one or more services 270 managed by the one or more virtual servers 275. At step 505, the visualizer tool 400 determines from the configuration two or more services 270 having a common set of configuration properties and managed by a first virtual server 275. At step 507, the visualizer tool 400 establishes a service container comprising the two or more services 270. At step 509, the visualizer tool 400 displays via a user interface a graphical representation of: (1) the configuration and the operational status of the first virtual server 275 and (2) the service container identifying the common set of configuration properties of the two or more services 270. At step 511, the visualizer tool 400 indicates an error if two or more service containers include a common service.

In further details of step 501, a user invokes a visualizer tool 400 for an intermediary device 200 that manages network traffic between a plurality of clients 102 and a plurality of servers 106. The plurality of servers 106 may provide one or more of the services managed by the one or more virtual servers 275. In some embodiments, a user or an administrator (hereafter sometimes generally referred to as "user") invokes a visualizer tool 400 from one of: a client device 102, the intermediary device 200, and a terminal device connected to the intermediary device 200. The user may invoke the visualizer tool 400 from a user interface provided by the intermediary device, such as a management user interface or a configuration tool. The user may invoke the visualizer tool 400 as part of a tool, utility and/or user interface for configuring the intermediary device 200. In one embodiment, the intermediary device 200 automatically executes the visualizer tool 400 when a user logs into the intermediary device, for example as an administrator.

In some embodiments, the intermediary device 200 executes the visualizer tool 400. In other embodiments, a client device 102, a server 106, or another network device executes the visualizer 400 on behalf of the intermediary device 200. The intermediary device 200 may transmit an executable file to a device operated by a user for execution to provide the visualizer tool 400. The intermediary device 200 may provision the visualizer tool 400 to a device operated by a user. The intermediary device 200 may transmit a graphical user interface of the visualizer tool 400 to a device operated by a user. The intermediary device 200 may include one or more virtual servers 275 managing a plurality of services 270. The intermediary may execute and/or provide the one or more of the virtual servers 275. One or more virtual servers 275 may be bound to an external server 106, such as a load balancing server. Some of the plurality of services 270 may be provided by the backend servers 106. Some of the plurality of services may be provided by the virtual servers 275.

At step 503, the visualizer tool 400 identifies a configuration and an operational status of the one or more virtual servers 275 and one or more services 270 managed by the one or more virtual servers 275. The visualizer tool 400 may identify a configuration and/or an operational status of the one or more services via the one or more virtual servers 275 managing these services. The user may invoke the visualizer tool 400 to access at least one of a configuration and an operational status of any entity. Embodiments of entities involved in a deployment are described above in connection with FIGS. 4A-4G, examples of which include virtual servers 275, services 270, service containers, monitors, policies, applications, application units, and VIPs. For example and in one embodiment, the virtualization tool 400 may retrieve the configuration and the operational status from at least one of: the one or more virtual servers 275 and a storage device of the intermediary device 200.

The visualizer tool 400 may communicate with one or more entities (e.g., virtual servers and backend servers 106) to retrieve the configuration and/or operational status information. In some embodiments, the visualizer tool obtains configuration and/or operational information as tracked by the appliance 200, such as via one or more objects or data structures in memory or information stored in a file. For example and in one embodiment, the visualizer tool 400 may query a backend server 106 for an operational status. The visualizer tool 400 may communicate with a collection agent executing on the backend server for information. In another embodiment and example, the visualizer tool 400 may generate and transmit a request to a hypervisor or other component of the intermediary device 200 managing and/or providing a virtual server 275. The visualizer tool 400 may retrieve the configuration and/or operational status information from a storage device, such as any embodiment of memory devices 122, 128, 264 and cache 140, as described above in connection with FIGS. 1E, 1F and 2A. The visualizer tool 400 may process data collected from an entity or from a storage device to determine the configuration and the operational status.

In some embodiments, the visualizer tool 400 identifies that a virtual server 275 or a service 270 has an operational status or state that is active or "UP". The visualizer tool 400 may identify that a virtual server or a service has an operational status or state that is inactive or "DOWN". The visualizer tool 400 may identify that a virtual server or a service has an operational status or state that is "OUT OF SERVICE". The visualizer tool 400 may identify that a virtual server or a service has an unknown operational status or state. The visualizer tool 400 may identify the operational status, including statistical data associated with the utilization, health, performance, traffic, CPU and/or memory usage, and policy hits pertaining to the operation of a virtual service 275 or service 270. The visualizer tool 400 may identify statistical data associated with traffic, including but not limited to: the number of requests and/or responses per unit time, the number of client connections, and traffic throughput.

Further, the identified operational status and configuration information may include information such as VIPs of virtual servers, client information, bound monitors, any type or form of data collected by bound monitors, bound policies, policy labels, protocol type, IP address and port information, service type and service group. As applied to applications, the visualizer tool 400 may identify information substantially similar to those discussed above as well as information regarding, but not limited to, public endpoints, VIPs, backend servers 106 and application units. In some embodiments, the visualizer tool 400 may determine that the identified configuration supports or provides at least one of: content switching, traffic management, load balancing, content rewrite (e.g., HTML insertion), cache redirection, data acceleration (e.g., SSL acceleration), security and application firewall (e.g., support for FIPS), health monitoring, SSL VPN, and DNS.

In some embodiments, the identified configuration may indicate that a second virtual server 275b is bound to a first virtual server 275a. For example and in one embodiment, the identified configuration may indicate that a load balancing virtual server 275b is bound to a content switching virtual server 275a. The identified configuration may indicate that a first policy (e.g. rewrite policy) is bound to a first virtual server 275a, application unit or service 270. The identified configuration may indicate that a first monitor is bound to a first virtual server or service.

At step 505, the visualizer tool 275b determines from the configuration two or more services 270 having a common set of configuration properties and managed by a first virtual server 275. The visualizer tool 275b may determine that two or more services are bound to a first virtual server 275. For example and in one embodiment, two services of type "HTTP" may be bound to a content switching virtual server 275. In some embodiments, the visualizer tool 275b may first determine all services bound to a first virtual server before comparing the configuration properties of the services. The visualizer tool 275b may determine that the two or more services 270 share a common set of configuration properties. In some embodiments, the common set of configuration properties is not limited to, but includes at least one of: a monitoring function, a policy, a policy label and a service group of the service. The common set of configuration properties may include one or more required properties. For example and in one embodiment, the common set of configuration properties may require having the same monitor (or monitoring function) bindings. In some embodiments, the monitor bindings should have the same weight and/or binding state. In certain embodiments, exceptions to the common set of configuration properties may include one or more of: service name, IP address and port information.

In further details of step 507, the visualizer tool 400 establishes a service container comprising the two or more services. Responsive to the determination that two or more services share a common set of configuration properties, the visualizer tool 400 may establish a service container comprising the two or more services. The visualizer tool 400 may establish the service container and bind the service container to the first virtual server 275. The visualizer tool 400 may select and configure the service container from one of a plurality of service container templates available in the visualizer tool 400. The visualizer tool 400 may select the service container from one or more service containers already associated with the first virtual server. The visualizer tool 400 may establish the service container as a new service container. The visualizer tool 400 may establish the service container as a new service container based on the common set of configuration properties.

The visualizer tool 400 may establish the service container to represent the set of configuration properties common to the two or more services. In some embodiments, the visualizer tool 400 may establish the service container to represent a subset of configuration properties common to the two or more services. This subset of configuration properties may require one or more properties identified as essential to or meeting the requirements for the formation of the service container. The visualizer tool 400 may maintain the existing monitor and/or policy bindings to each of the two or more services. The visualizer tool 400 may consolidate the existing monitor and/or policy bindings of the two or more services to a set of monitor and/or policy bindings to the service container. Although generally described using services, it should be understood that the methods described herein can also be applicable and/or extended to service groups, or a mix of services and service groups.

At step 509, the visualizer tool 400 displays via a user interface a graphical representation of: (1) the configuration and the operational status of the first virtual server and (2) the service container identifying the common set of configuration properties of the two or more services. In certain embodiments, the visualizer tool 400 may display a configuration and/or operational status of a functional deployment (e.g., content switching, load balancing and content rewriting) of the intermediary device 200. The visualizer tool 400 may display a configuration and/or operational status of a functional deployment as a graphical representation of entities involved in the deployment. The visualizer tool 400 may generate a graphical representation responsive to the identification and/or retrieval of the configuration and the operational status information in step 503.

The visualizer tool 400 may generate the graphical representation responsive to the establishment of the service container. The visualizer tool 400 may generate a tree structure for a selected entity (e.g. virtual server or application) as a parent node. The visualizer tool 400 may generate a tree structure relating the one or more virtual servers and the one or more services. The visualizer tool 400 may generate a tree structure relating the one or more virtual servers and the one or more services via one or more service containers established in step 507. The visualizer tool 400 may generate a graphical representation (e.g., a tree structure) relating and including, but not limited to one or more of the following entities: an virtual server, a VIP, an application, an application unit, a service group, a service container, a service, a policy, a monitor, a configured policy label, and a supported protocol. The visualizer tool 400 may generate the graphical representation to include one or more bindings between any pair and/or groups of entities.

In some embodiments, the visualizer tool 400 displays via a user interface a graphical representation of the service container identifying the common set of configuration properties of the two or more services. The visualizer tool 400 may represent the service container as a icon consolidating the two or more services. The visualizer tool 400 may display details of the service container in the graphical representation, for example, the number of services in the service container, the percentage utilization of the services, and the supported protocol. The visualizer tool 400 may display a consolidated configuration and/or operational status of the services in the service container. In some embodiments, the visualizer tool 400 may represent a service container as a child node of a virtual server, a VIP, a service group, or an application unit.

In further details of step 511, the visualizer tool 400 indicates an error if two or more service containers comprise a common service. The visualizer tool 400 may determine that there is a configuration issue or error based on application of certain rules and/or policies. For example and in one embodiment, the visualizer tool 400 may determine that there is a configuration issue or error if two service containers representing a common set of configuration properties co-exists in relation to a same virtual server or application. The visualizer tool 400 may determine that there is a configuration issue or error if one service is associated with two or more service containers. In one embodiment, an administration may correct the configuration issue or error by selecting and/or applying the configuration of one of these service containers. The visualizer tool 400 may determine that there is a configuration issue or error is there is insufficient information from a service to associate the service with a service container or to establish a new service container.

Although generally described in terms of a virtual server 275, some or all steps described above in connection with FIG. 5A can apply to an application. For example and in some embodiments, a user invokes a visualizer tool 400 for an intermediary device 200 that may include one or more applications managing a plurality of services 270. The visualizer tool 400 may identify a configuration and an operational status of the one or more applications and one or more services managed by the one or more applications. The visualizer tool 400 may determine from the configuration two or more services having a common set of configuration properties and managed by a first application. The visualizer tool 400 may establish a service container comprising the two or more services. Further, the visualizer tool 400 may display via a user interface a graphical representation of: (1) the configuration and the operational status of the first application and (2) the service container identifying the common set of configuration properties of the two or more services. The visualizer tool 400 may indicate an error if two or more service containers comprise a common service.

Referring now to FIG. 5B, a flow diagram depicting an embodiment of steps of a method 550 of providing management of network services provided by an intermediary device 200 is shown. In brief overview, at step 551, a visualizer tool 400 of an intermediary device, retrieving a configuration and an operational status of one or more virtual servers of the intermediary device and a plurality of services managed by the one or more virtual servers. The configuration and operational status is retrieved from at least one of: the one or more virtual servers and a storage device of the intermediary device 200. The intermediary device 200 manages network traffic between a plurality of a clients and a plurality of servers. At step 553, the visualizer tool 400 displays a graphical representation of the configuration and the operational status. At step 555, the visualizer tool 400 provides, in the graphical representation, a first service container comprising one or more services having a common set of configuration properties. At step 557, the visualizer tool 400 receives via the user interface an indication of a change to one or more configuration properties of a service of the first service container. At step 559, the visualizer tool 400 assigns the service to a second service container based on the change. At step 561, the visualizer tool 400 displays in the graphical representation a configuration and an operational status of services in the second service container. At step 563, the visualizer tool 400 initiates, based on the change in the one or more properties of the service, a change in at least one of: a configuration of the intermediary device and a configuration of one of the plurality of servers providing the service.

In further details of step 551, a visualizer tool 400 of an intermediary device 200 retrieves a configuration and an operational status of one or more virtual servers 275 of the intermediary device 200 and a plurality of services managed by the one or more virtual servers 275. One or more of the plurality of services 270 may be provided by the plurality of servers 106 and/or the one or more virtual servers 275. The intermediary device 200 manages network traffic between a plurality of a clients and a plurality of servers. The configuration and operational status may be retrieved from at least one of: the one or more virtual servers 275 and a storage device of the intermediary 200. Further embodiments of steps for retrieving and/or identifying the configuration and/or the operational status are described above in connection with step 503.

At step 553, the visualizer tool 400 displays a graphical representation of the configuration and the operational status. The visualizer tool 400 may display a graphical representation of the configuration in connection with a deployment of at least one of: content switching, traffic management, load balancing, content insertion, cache redirection, data acceleration, security and application firewall, and health monitoring. The visualizer tool 400 may display a graphical representation of the operational status in connection with a deployment of at least one of: content switching, traffic management, load balancing, content insertion, cache redirection, data acceleration, security and application firewall, and health monitoring. Further embodiments of steps for generating and/or displaying the configuration and/or the operational status are described above in connection with step 509.

In further details of step 555, the visualizer tool 400 provides, in the graphical representation, a first service container comprising one or more services having a common set of configuration properties. The visualizer tool 400 may provide a first service container including the one or more services managed by a first virtual server. The visualizer tool 400 may provide a first service container including the one or more services bound to a first virtual server. In some embodiments, the visualizer tool 400 establishes the first service container as a new service container for the one or more services. The visualizer tool 400 may establish the first service container as a new service container based on the common set of configuration properties. Further embodiments of steps for providing the first container are described above in connection with steps 505-507.

At step 557, the visualizer tool 400 receives via the user interface an indication of a change to one or more configuration properties of a service of the first service container. The visualizer tool 400 may receive an indication of a change to a configuration property of a service from a user or administrator. The visualizer tool 400 may receive an indication of a change to a configuration property of a service from a virtual server managing and/or providing the service. The visualizer tool 400 may receive an indication of a change to a configuration property of a service from a backend server 106 providing the service. The visualizer tool 400 may receive an indication of a change during the retrieval of configuration information, for example, in a routine update to access the latest configuration data.

The visualizer tool 400 may receive an indication of a change to the one or more configuration properties of the service, including but not limited to at least one of: a change in a monitor binding (i.e., active monitoring functions) and a change in the service group or type of the service. For example and in one embodiment, the change may be a change in the weight and/or binding state of a monitor binding. The visualizer tool 400 may receive an indication of a removal of a monitor binding or addition of a new binding to the service.

The visualizer tool 400 may receive an indication of a change to any other bindings of the service, such a policy bindings. The change may be a change in state of the service, e.g., when the service becomes inactive (DOWN), is out-of-service, or the state becomes unknown. The change may be a change in the protocol supported by the service, or due to a change in the configuration of the backend server 106 providing the service. Some or all of these changes may be configured by a user or administrator via the user interface of the visualizer tool 400. For example and in some embodiments, the drag-and-drop actions described above in connection with FIG. 4G to bind a new entity may provide an indication of a change in the configuration properties.

In further details of step 559, the visualizer tool 400 assigns the service to a second service container based on the change. In some embodiments, the visualizer tool 400 does not assign the service to a second service container based on the change. For example and in one embodiment, a change in the service name, IP address and/or port information of a service may not require a re-assignment of the service to a second service container. The visualizer tool 400 may select or establish the second container based on the change in the configuration properties of the service. The visualizer tool 400 may select or establish the second container to be defined by a second set of configuration properties in common with the service after the change. The visualizer tool 400 may establish the second service container as a new service container if no other service container represents or is defined by the second set of configuration properties in common with the service. Further embodiments of steps for selecting or establishing the second service container are described above in connection with step 507. Although some of these embodiments may describe a service container for two or more services, it should be understood that the method describes herein can apply to, or be adapted for, selecting or establishing a service container for a single service.

At step 561, the visualizer tool 400 displays in the graphical representation a configuration and an operational status of services in the second service container. The visualizer tool 400 may present or display a consolidated configuration and/or operational status of services in the second service container, the services including the aforementioned assigned service. In some embodiments, the second service container comprised only the aforementioned assigned service, and the configuration and an operational status of the second service container is accordingly and the configuration and an operational status of the assigned service.

The visualizer tool 400 may display the configuration and/or operational status including at least one of: the service type of the one or more services of the second service container, the utilization of the one or more services, and the number of services in the second service container. The visualizer tool 400 may also display one or more of the: supported protocol, the service type or group, the bindings to the second container (e.g., of virtual servers, VIPs, application units, policies and monitors). Further embodiments of steps for displaying the configuration and/or operational status of a service container are described above in connection with step 509.

In further details of step 563, the visualizer tool 400 initiates, based on the change in the one or more properties of the service, a change in at least one of: a configuration of the intermediary device and a configuration of one of the plurality of servers providing the service. The visualizer tool 400 may initiate a change in the backend server 106 that provides the service. The visualizer tool 400 may initiate a change in the virtual server 275 that provides and/or manages the service. The visualizer tool 400 may initiate a change in the configuration of a functional (e.g., content switching or load balancing) deployment based on the change in the one or more properties of the service. For example and in one embodiment, the visualizer tool 400 may indicate an issue in the deployment if there is no replacement service to provide the needed functionality and/or resources. The visualizer tool 400 may initiate a change in the configuration of an application and/or application unit managing or deploying the service. For example, the visualizer tool 400 may communicate this change to the application unit to notify the public endpoints (e.g., client devices).

The visualizer tool 400 may initiate a change in the configuration of the intermediary device 200 based on the change in the one or more properties of the service. For example and in one embodiment, the visualizer tool 400 may deploy a second service in place of the changed service. If the change involves a new binding, the visualizer tool 400 may indicate this to the intermediary device 200 to activate the new binding. For example, a policy engine of the intermediary device may be configured to reflect a new or changed policy binding. Monitoring agents may be activated and/or transmitted to the appropriate destination points based on a new monitor binding. Monitoring agents may be de-activated based on a removal of an existing monitor binding.

In some embodiments, a user or administrator initiates the change via the user interface of the visualizer tool 400. For example and in one embodiment, a drag-and-drop action to add a new monitor binding initiates the change in the configuration of a load balancing deployment (i.e., monitoring agents are activated corresponding to the monitor binding). In certain embodiments, change or modification via the user interface of the visualizer tool 400 does not effect a change in configuration until a user or administrator applies the configuration. For example, an administrator can modify the configuration of a deployment or an entity in the visualizer tool 400 to simulate a certain scenario or to allow the visualizer tool 400 to flag out issues with a new configuration. For example, once configuration issues have been fixed, the administrator can apply or deploy the configuration. At such a point, the visualizer tool 400 can initiate a change in the configurations of some or all of the deployed entities.

Although generally described in terms of a virtual server 275, some or all steps described above in connection with FIG. 5B can apply or be extended to an application. For example and in some embodiments, a visualizer tool 400 of an intermediary device 200 may retrieve a configuration and an operational status of one or more applications of the intermediary device and a plurality of services managed by the one or more virtual servers. The configuration and operational status is retrieved from at least one of: the one or more applications and a storage device of the intermediary. The intermediary device 200 may manage network traffic between a plurality of a clients and a plurality of servers. The visualizer tool 400 may display a graphical representation of the configuration and the operational status. The visualizer tool 400 may provide, in the graphical representation, a first service container comprising one or more services having a common set of configuration properties. The visualizer tool 400 may receive via the user interface an indication of a change to one or more configuration properties of a service of the first service container. The visualizer tool 400 may assign the service to a second service container based on the change. The visualizer tool 400 may display in the graphical representation a configuration and an operational status of services in the second service container. The visualizer tool 400 may initiate, based on the change in the one or more properties of the service, a change in at least one of: a configuration of the intermediary device and a configuration of one of the plurality of servers providing the service.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of the invention as defined by the following claims.

What is claimed is:

1. A method of providing management of network services provided by an intermediary device, the method comprising:
   (a) invoking a visualizer tool for an intermediary device that manages network traffic between a plurality of clients and a plurality of servers, the intermediary device executing one or more virtual servers managing a plurality of services executing on the plurality of servers, the plurality of services providing one or more applications to the plurality of clients;
   (b) identifying, by a visualizer tool, a configuration and an operational status of the one or more virtual servers and one or more services managed by the one or more virtual servers;
   (c) determining, by the visualizer tool from the configuration, two or more services having a common set of configuration properties and managed by a first virtual server;
   (d) establishing, by the visualizer tool, a service container comprising an identification of the common set of configuration properties of the two or more services; and
   (e) displaying, by the visualizer tool via a user interface, a graphical representation of: (1) the configuration and the operational status of the first virtual server and (2) the service container identifying the common set of configuration properties of the two or more services.

2. The method of claim 1, wherein step (b) further comprises retrieving the configuration and the operational status from at least one of: the one or more virtual servers and a storage device of the intermediary.

3. The method of claim 1, wherein step (b) further comprises identifying the configuration, the identified configuration providing at least one of: content switching, traffic management, load balancing, content insertion, cache redirection, data acceleration, security and application firewall, and health monitoring.

4. The method of claim 1, wherein step (b) further comprises identifying the configuration, the identified configuration indicating that a second virtual server is bound to a first virtual server.

5. The method of claim 1, wherein step (b) further comprises identifying the configuration, the identified configuration indicating that a first policy is bound to a first virtual server.

6. The method of claim 1, wherein the common set of configuration properties comprises at least one of: a monitoring function, a policy, a policy label and a service group of the service.

7. The method of claim 1, wherein step (d) further comprises establishing the service container, the service container representing the set of configuration common to the two or more services.

8. The method of claim 1, further comprising indicating, by the visualizer tool, an error if two or more service containers comprises a common service.

9. The method of claim 1, further comprising providing, by one of the plurality of servers, at least one of the services managed by the one or more virtual servers.

10. A method of providing management of network services provided by an intermediary device, the method comprising:
(a) displaying, by a visualizer tool of an intermediary device, a graphical representation of a configuration and an operational status of one or more virtual servers executing on the intermediary device and a plurality of services, providing one or more applications to a plurality of clients, managed by the one or more virtual servers, the intermediary device managing network traffic between a plurality of clients and a plurality of servers;
(b) providing, by the visualizer tool, in the graphical representation a first service container comprising an identification of a common set of configuration properties of one or more services;
(c) receiving, by the visualizer tool via the user interface, an indication of a change to one or more configuration properties of a service of the first service container;
(d) assigning, by the visualizer, the service to a second service container based on the change; and
(e) displaying, by the visualizer tool, in the graphical representation a configuration and an operational status of services in the second service container.

11. The method of claim 10, wherein step (a) further comprises retrieving the configuration and the operational status from at least one of: the one or more virtual servers and a storage device of the intermediary.

12. The method of claim 10, wherein step (a) further comprises displaying the graphical representation of the configuration, the configuration providing at least one of: content switching, traffic management, load balancing, content insertion, cache redirection, data acceleration, security and application firewall, and health monitoring.

13. The method of claim 10, wherein step (c) further comprises receiving the indication of a change to the one or more configuration properties of the service, comprising at least one of: a change in a monitoring function and a change in the service group of the service.

14. The method of claim 10, wherein step (d) further comprises assigning the service to the second service container, the second service container representing a second set of configuration properties in common with the service after the change.

15. The method of claim 10, wherein step (d) further comprises establishing the second service container as a new service container if no other service containers represent the second set of configuration properties in common with the service.

16. The method of claim 10, wherein step (e) further comprises displaying at least one of: the service type of one or more services of the second service container, the utilization of the one or more services, and the number of services in the second service container.

17. The method of claim 10, further comprising initiating, by the visualizer tool based on the change in the one or more properties of the service, a change in at least one of: a configuration of the intermediary device and a configuration of one of the plurality of servers providing the service.

18. The method of claim 10, wherein the one or more services of the service container are managed by a first virtual server.

19. The method of claim 10, further comprising providing, by one of the plurality of servers, the service.

20. A method of providing management of network services provided by an intermediary device, the method comprising:
(a) invoking a visualizer tool for an intermediary device that manages network traffic between a plurality of clients and a plurality of servers, the intermediary device executing one or more applications managing a plurality of services executing on the plurality of servers, the plurality of services providing one or more applications to the plurality of clients;
(b) identifying, by a visualizer tool, a configuration and an operational status of the one or more applications executing on the intermediary device and the one or more services, executing on the plurality of servers, managed by the one or more applications;
(c) determining, by the visualizer tool from the configuration, two or more services having a common set of configuration properties and managed by a first application;
(d) establishing, by the visualizer tool, a service container comprising an identification of the common set of configuration properties of the two or more services; and
(e) displaying, by the visualizer tool via a user interface, a graphical representation of: (1) the configuration and the operational status of the first application and (2) the service container identifying the common set of configuration properties of the two or more services.

* * * * *